(12) United States Patent
Fan et al.

(10) Patent No.: US 12,573,383 B2
(45) Date of Patent: *Mar. 10, 2026

(54) NATURAL LANGUAGE UNDERSTANDING

(71) Applicant: Amazon Technologies, Inc., Seattle, WA (US)

(72) Inventors: Xing Fan, Redmond, WA (US); Zheng Chen, Seattle, WA (US); Yuan Ling, Bellevue, WA (US); Lambert Leo Mathias, Seattle, WA (US); Chenlei Guo, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/853,013

(22) Filed: Jun. 29, 2022

(65) Prior Publication Data

US 2023/0089285 A1     Mar. 23, 2023

Related U.S. Application Data

(63) Continuation of application No. 16/788,085, filed on Feb. 11, 2020, now Pat. No. 11,386,890.

(51) Int. Cl.
| | |
|---|---|
| *G10L 15/197* | (2013.01) |
| *G10L 15/18* | (2013.01) |
| *G10L 15/22* | (2006.01) |
| *G10L 15/30* | (2013.01) |

(52) U.S. Cl.
CPC ........ *G10L 15/197* (2013.01); *G10L 15/1815* (2013.01); *G10L 15/22* (2013.01); *G10L 15/30* (2013.01); *G10L 15/1822* (2013.01); *G10L 2015/223* (2013.01)

(58) Field of Classification Search
CPC ... G10L 15/197; G10L 15/1815; G10L 15/22; G10L 15/30; G10L 15/1822; G10L 2015/223
See application file for complete search history.

(56) References Cited

U.S. PATENT DOCUMENTS

| | | | | |
|---|---|---|---|---|
| 9,607,617 | B2 * | 3/2017 | Hebert | G10L 15/22 |
| 9,916,826 | B1 * | 3/2018 | Slifka | G10L 15/00 |
| 11,017,167 | B1 * | 5/2021 | Podgorny | G06F 18/29 |
| 2003/0004714 | A1 * | 1/2003 | Kanevsky | G10L 15/22 |
| | | | | 704/E15.04 |
| 2008/0059188 | A1 * | 3/2008 | Konopka | G10L 15/22 |
| | | | | 704/E15.04 |
| 2014/0365226 | A1 * | 12/2014 | Sinha | G10L 15/22 |
| | | | | 704/275 |
| 2016/0027055 | A1 * | 1/2016 | Dixon | H04L 67/535 |
| | | | | 705/14.58 |

(Continued)

*Primary Examiner* — Darioush Agahi
(74) *Attorney, Agent, or Firm* — Pierce Atwood LLP

(57) ABSTRACT

A system is provided for reducing friction during user interactions with a natural language processing system, such as voice assistant systems. The system determines a pre-trained model using dialog session data corresponding to multiple user profiles. The system determines a fine-tuned model using the pre-trained model and a fine-tuning dataset that corresponds to a particular task, such as query rewriting. The system uses the fine-tuned model to process a user input and determine an alternative representation of the input that can result in a desired response from the natural language processing system.

15 Claims, 15 Drawing Sheets

(56)        References Cited

U.S. PATENT DOCUMENTS

| | | | |
|---|---|---|---|
| 2016/0132605 A1* | 5/2016 | Jiang | G06F 16/2457 |
| | | | 707/728 |
| 2017/0213545 A1* | 7/2017 | Kwon | G06N 5/022 |
| 2018/0068657 A1* | 3/2018 | Khan | G06F 40/30 |
| 2018/0276553 A1* | 9/2018 | Redkar | G06N 20/00 |
| 2019/0080046 A1* | 3/2019 | Apte | G16H 50/20 |
| 2019/0371296 A1* | 12/2019 | Iwase | G06F 40/237 |
| 2021/0035587 A1* | 2/2021 | Aher | G10L 13/02 |
| 2021/0056489 A1* | 2/2021 | Wright | G06Q 10/10 |

* cited by examiner

FIG. 1

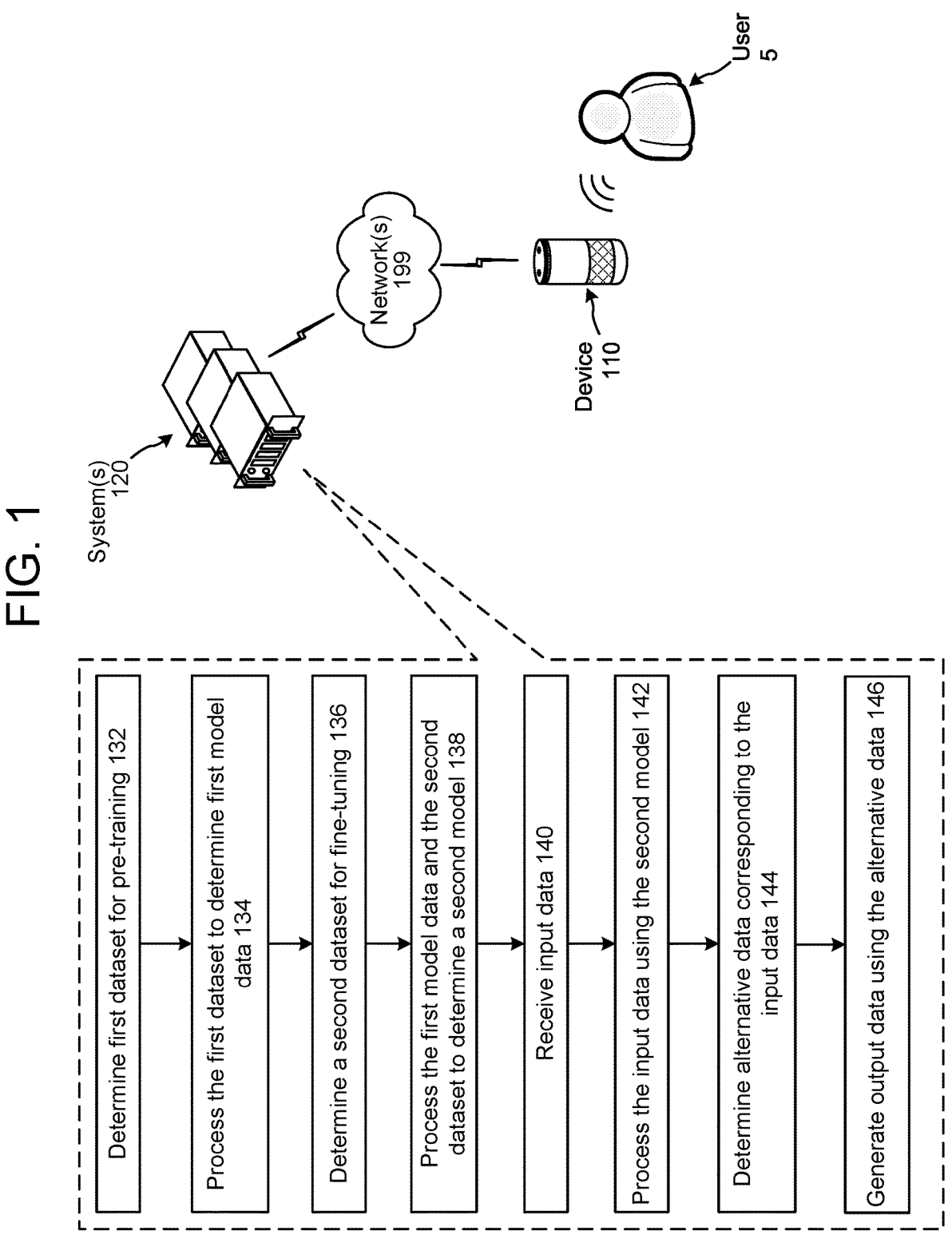

System(s)
120

Network(s)
199

Device
110

User
5

Determine first dataset for pre-training 132

Process the first dataset to determine first model data 134

Determine a second dataset for fine-tuning 136

Process the first model data and the second dataset to determine a second model 138

Receive input data 140

Process the input data using the second model 142

Determine alternative data corresponding to the input data 144

Generate output data using the alternative data 146

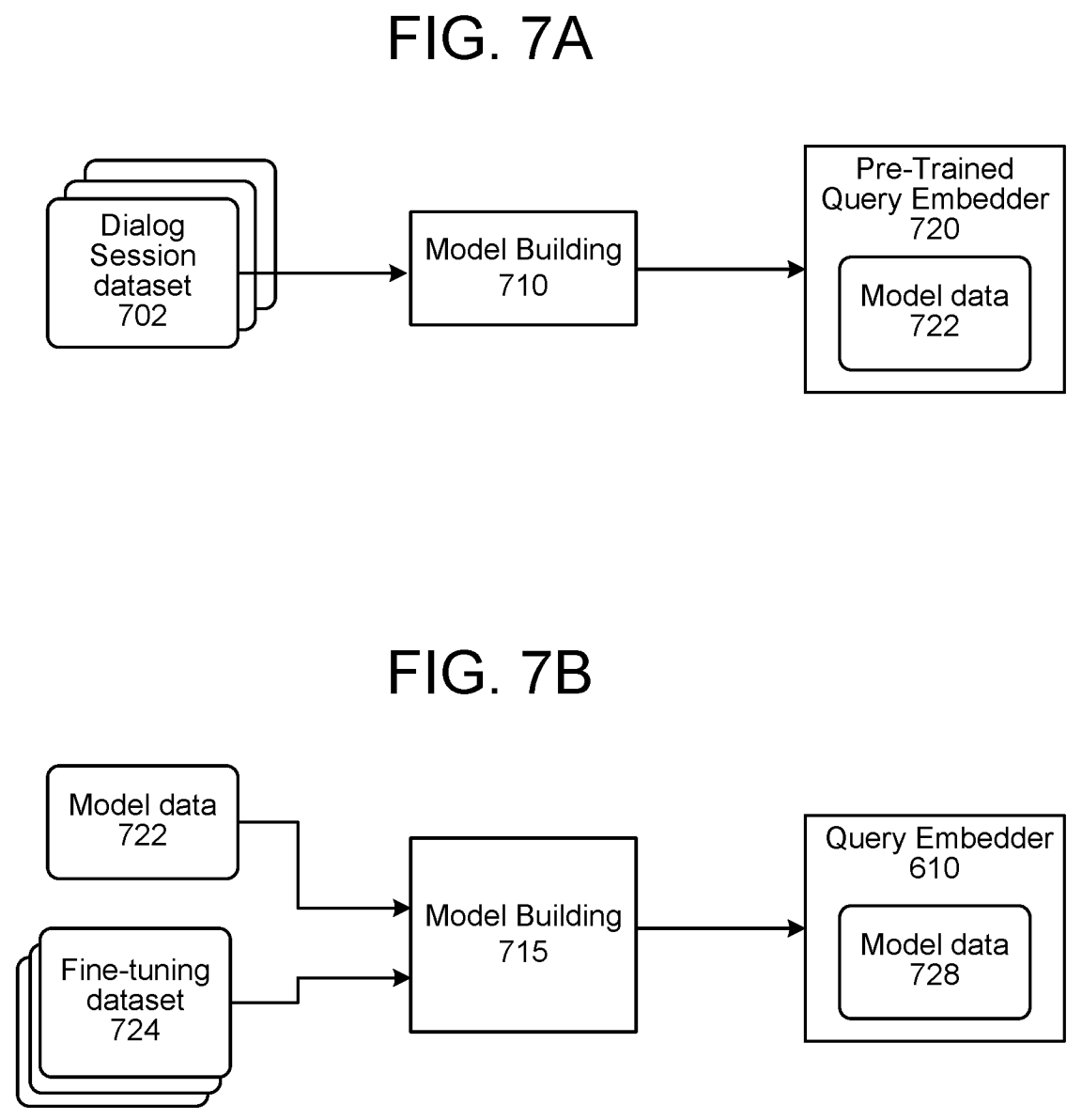

Dialog Session dataset 702

Model Building 710

Pre-Trained Query Embedder 720

Model data 722

FIG. 7B

Model data 722

Fine-tuning dataset 724

Model Building 715

Query Embedder 610

Model data 728

FIG. 9

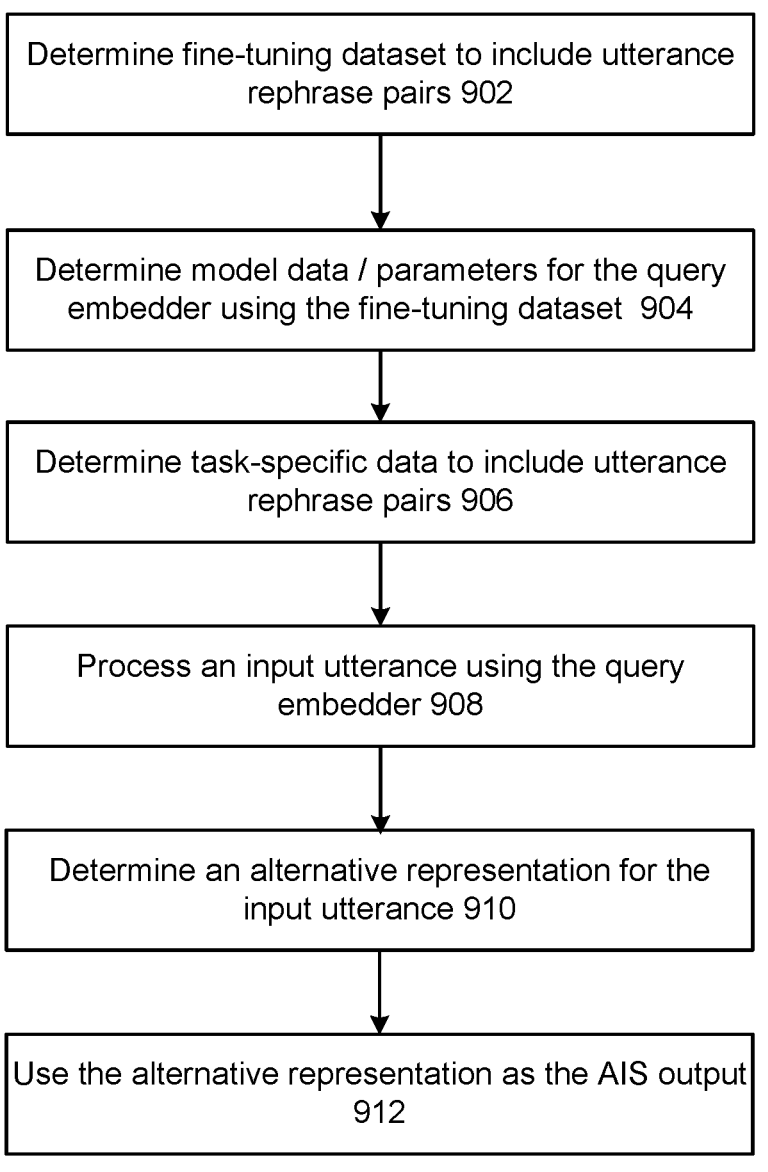

Determine fine-tuning dataset to include utterance rephrase pairs 902

Determine model data / parameters for the query embedder using the fine-tuning dataset 904

Determine task-specific data to include utterance rephrase pairs 906

Process an input utterance using the query embedder 908

Determine an alternative representation for the input utterance 910

Use the alternative representation as the AIS output 912

FIG. 10

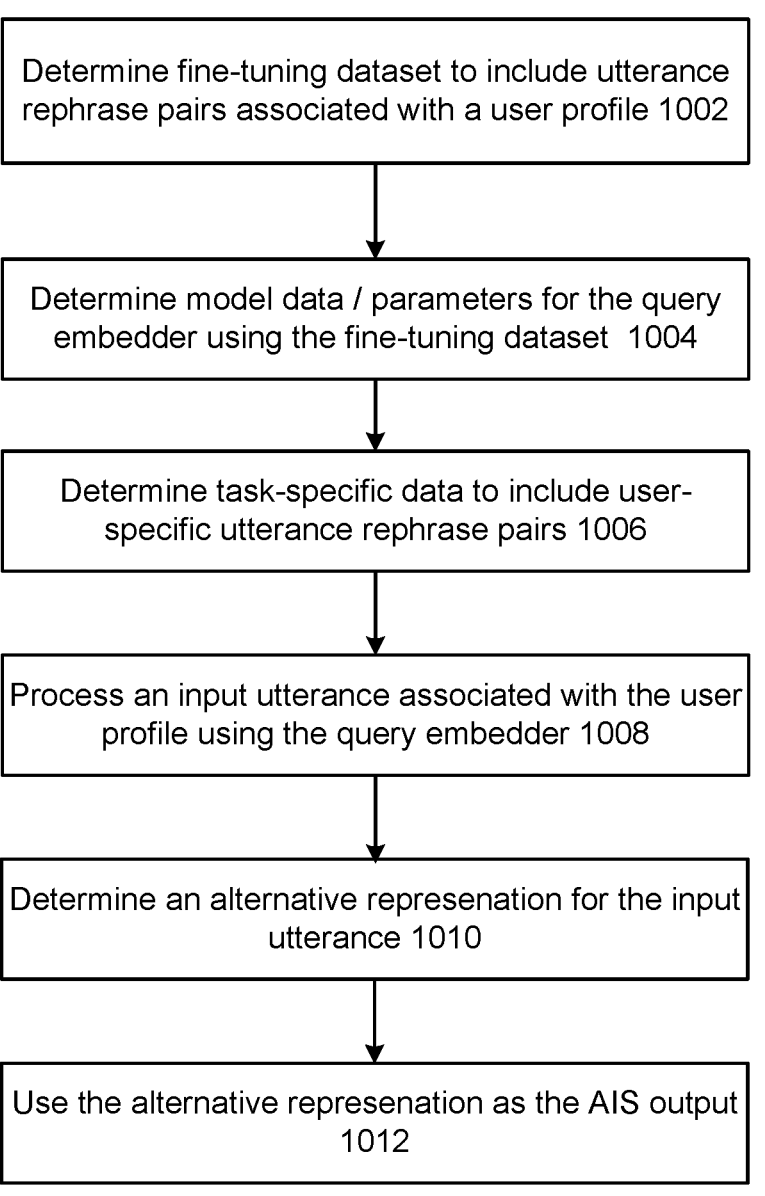

Determine fine-tuning dataset to include utterance rephrase pairs associated with a user profile 1002

Determine model data / parameters for the query embedder using the fine-tuning dataset  1004

Determine task-specific data to include user-specific utterance rephrase pairs 1006

Process an input utterance associated with the user profile using the query embedder 1008

Determine an alternative represenation for the input utterance 1010

Use the alternative represenation as the AIS output 1012

FIG. 11

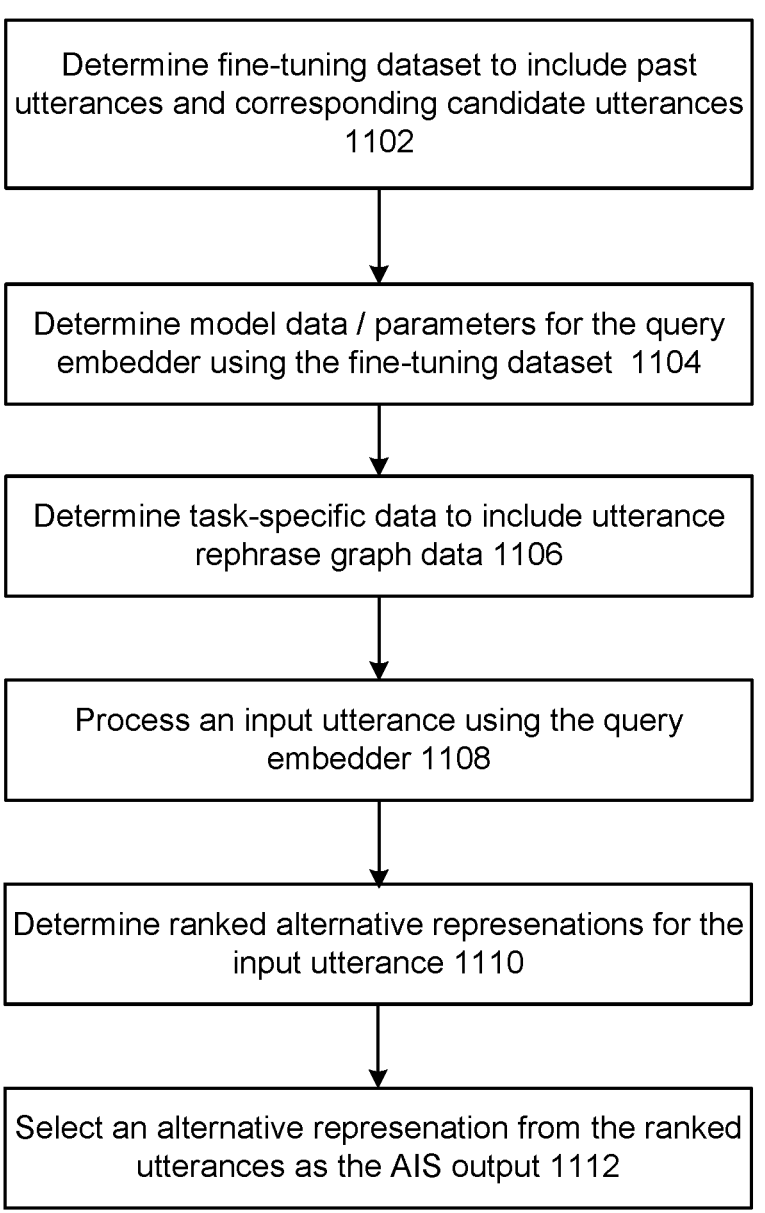

Determine fine-tuning dataset to include past utterances and corresponding candidate utterances 1102

Determine model data / parameters for the query embedder using the fine-tuning dataset 1104

Determine task-specific data to include utterance rephrase graph data 1106

Process an input utterance using the query embedder 1108

Determine ranked alternative represenations for the input utterance 1110

Select an alternative represenation from the ranked utterances as the AIS output 1112

FIG. 12

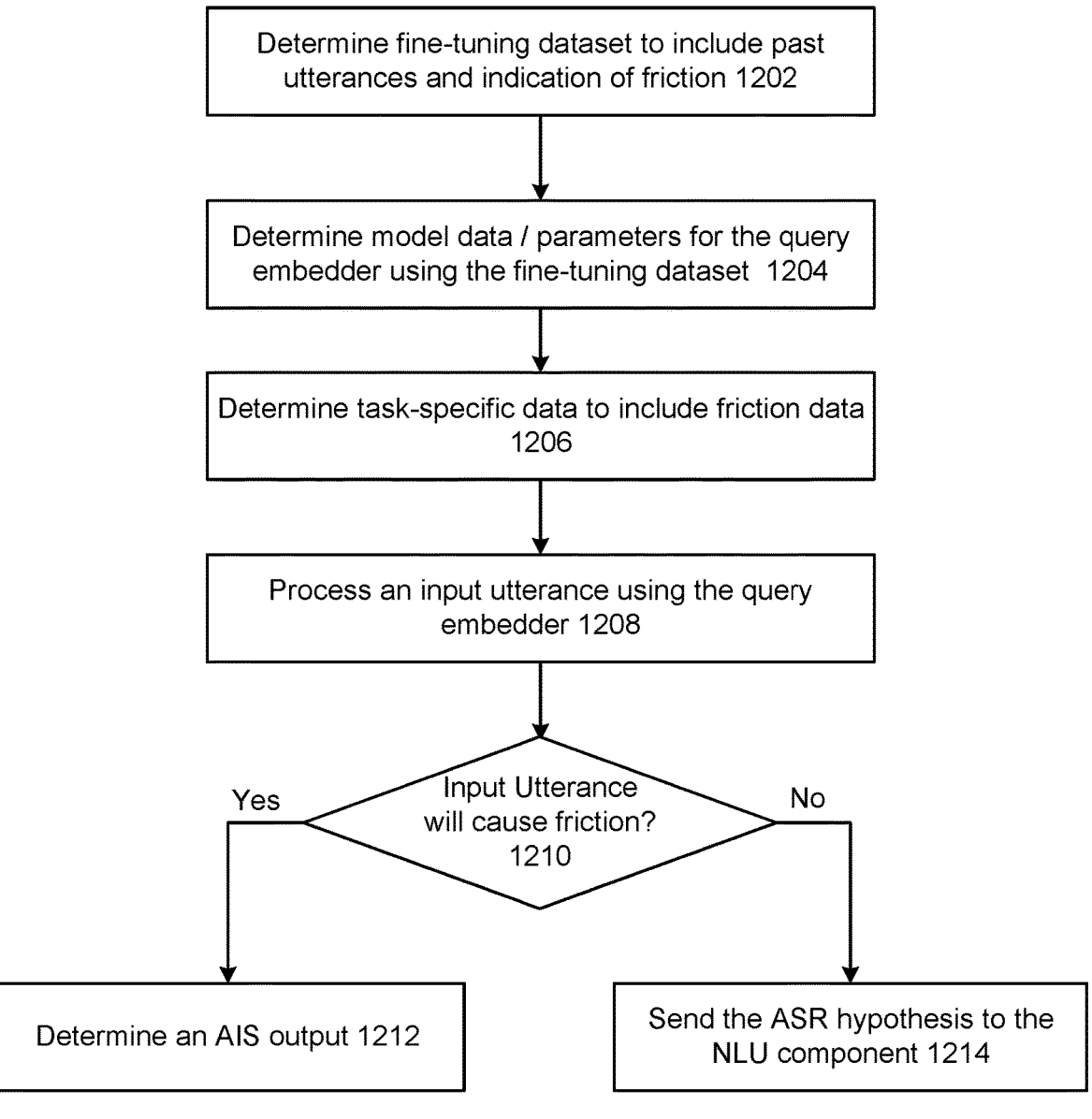

Determine fine-tuning dataset to include past utterances and indication of friction 1202

Determine model data / parameters for the query embedder using the fine-tuning dataset 1204

Determine task-specific data to include friction data 1206

Process an input utterance using the query embedder 1208

Input Utterance will cause friction? 1210

Yes

No

Determine an AIS output 1212

Send the ASR hypothesis to the NLU component 1214

FIG. 13

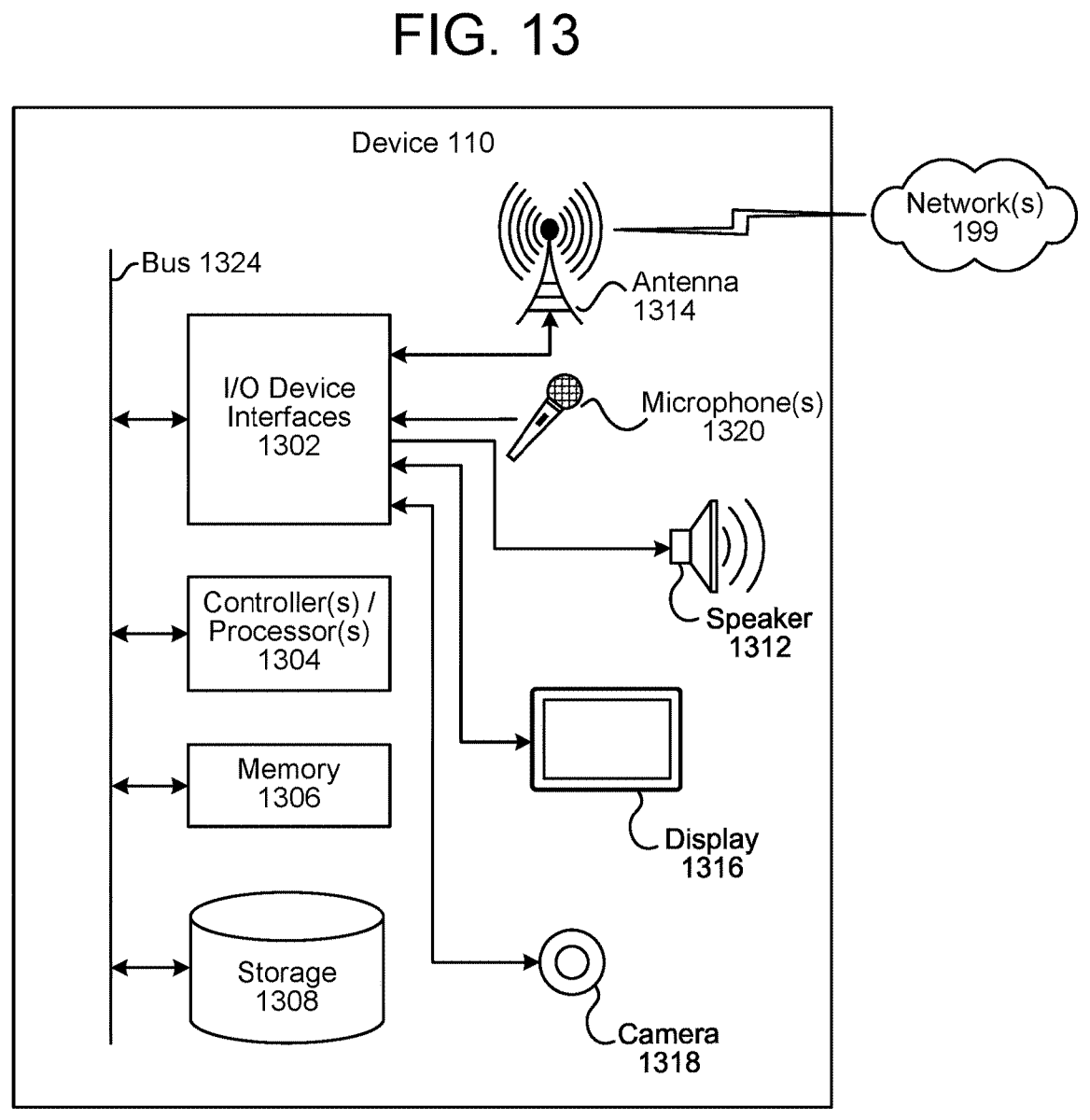

Network(s) 199

Device 110

Antenna 1314

Microphone(s) 1320

Speaker 1312

Display 1316

Camera 1318

Bus 1324

I/O Device Interfaces 1302

Controller(s) / Processor(s) 1304

Memory 1306

Storage 1308

FIG. 14

System(s) 120/225

Bus 1424

Network(s)
199

I/O Device
Interfaces
1402

Controller(s) /
Processor(s)
1404

Memory
1406

Storage
1408

NATURAL LANGUAGE UNDERSTANDING

CROSS REFERENCE TO RELATED APPLICATION

This application is a continuation of, and claims priority of U.S. Non-Provisional patent application Ser. No. 16/788,085, filed Feb. 11, 2020, and entitled "NATURAL LANGUAGE UNDERSTANDING," scheduled to issue as U.S. Pat. No. 11,386,890, the content of which is herein incorporated by reference in its entirety.

BACKGROUND

Spoken language understanding (SLU) systems have progressed to the point where humans can interact with computing devices using their voices. Such systems employ techniques to identify the words spoken by a human user based on the various qualities of a received audio input. An SLU system combines speech recognition and natural language understanding processing techniques enabling speech-based user control of a computing device to perform tasks based on the user's spoken commands. The combination of speech recognition and natural language understanding techniques is referred to herein as natural language processing. Natural language processing may also involve converting a user's speech into text data which may then be provided to various text-based software applications.

Natural language processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to determine a model for processing user inputs according to embodiments of the present disclosure.

FIG. 3 is a conceptual diagram illustrating how natural language understanding processing is performed according to embodiments of the present disclosure.

FIGS. 7A and 7B are conceptual diagrams of building the query embedder using a pre-training dataset and a fine-tuning dataset according to embodiments of the present disclosure.

FIG. 9 is a flowchart illustrating a process for using the query embedder to determine an alternative representation for an input according to embodiments of the present disclosure.

FIG. 10 is a flowchart illustrating a process for using the query embedder to determine an alternative representation for an input using user-specific data according to embodiments of the present disclosure.

FIG. 11 is a flowchart illustrating a process for using the query embedder to rank candidate alternative representations for an input according to embodiments of the present disclosure.

FIG. 12 is a flowchart illustrating a process for using the query embedder to determine whether an input will cause friction according to embodiments of the present disclosure.

FIG. 13 is a block diagram conceptually illustrating example components of a device according to embodiments of the present disclosure.

FIG. 14 is a block diagram conceptually illustrating example components of a system according to embodiments of the present disclosure.

DETAILED DESCRIPTION

Figure 2:
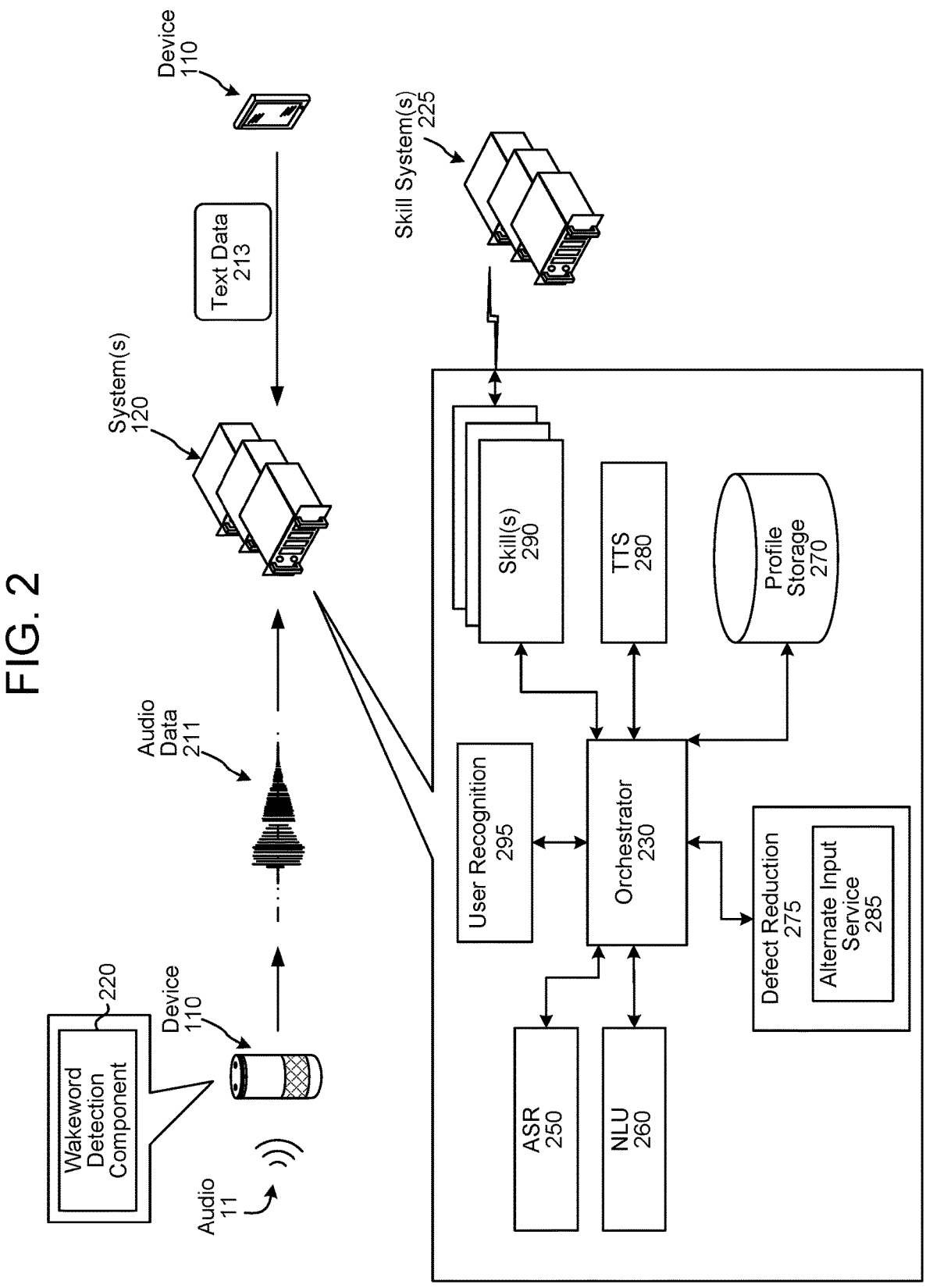
FIG. 2 is a conceptual diagram of components of a system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

A system may receive a user input as speech. For example, a user may speak an input to a device. The device may send audio data, representing the spoken input, to the system. The system may perform ASR processing on the audio data to generate text data representing the user input. The system may perform NLU processing on the text data to determine an intent of the user input as well as portions of the text data that may be used to perform an action responsive to the user input.

One potential failure point for a speech processing system occurs when an error in ASR processing propagates into downstream components such as the NLU, resulting in further errors. For example, a spoken input of "open YouTube" may be misrecognized during ASR processing as "open you too," and NLU may be unable to interpret/perform the user's desired action causing friction in the user experience. In some cases, the user may rephrase the input as "no, I said open YouTube" to correct the system's undesired response. Such inputs may be referred to as rephrase pairs, and may include the initial user input and the rephrased user input that is successfully processed by the system.

When the system provides an output that is not what the user wanted in response to the user input (e.g., "I am unable to process your request", the system plays the wrong song, the system times-out and does not respond at all, etc.), it causes friction in the user experience. There are a various reasons that cause friction during a user's interaction with a natural language processing system. For example, there could be errors relating to ASR, NLU, and/or entity recognition that accumulate through the processing pipeline, or there could be user errors such as a slip of tongue. Additionally or alternatively, the device could miss part of the user input due to delay in recognizing invocation/a wakeword. Sometimes a user may be concise during an initial query, which may cause the system to misunderstand the user's intent, causing the user to then refine or expand the initial query. Such friction may lead to delay in achieving the user's request and possible abandonment of the task by the user.

To reduce user frustration and other friction caused by errors in ASR, NLU or other aspects of natural language processing, the system of the present disclosure may implement one or more techniques. As an example of one technique, called query rewriting, the system may use rephrase pairs, as indicated by various users and as determined by the system, to rewrite a user input so that the system can output the desired response.

For example, the system of the present disclosure configures a query embedder by pre-training the model using historical data (historical user interactions with a voice assistant, including the user input and the system-generated response), to incorporate contextual information and prior user interactions into the query embedder. Then the system fine-tunes the model using a smaller dataset including rephrase pairs. The system uses the model trained in this manner to determine an alternative representation for a user input that results in the desired response to the user input.

The pre-trained model can be fine-tuned for other techniques that enable the system to reduce friction in the user experience. In one example, the pre-trained model can be fine-tuned using a dataset that includes multiple candidate alternative representations for an input. The system may use such a model to rank the candidate alternative representations. In another example, the pre-trained model can be fine-tuned using a dataset that includes rephrase pairs corresponding to a particular user or particular types of users. Such a model can be used by the system to determine a rewrite for a particular user based on user-specific data. In another example, the pre-trained model can be fine-tuned using a dataset that includes a user input and a corresponding indication of whether the user input was successfully processed. Such a model can be used by the system to determine if a user input is likely to cause friction due to an error in processing.

Using a query embedder that is pre-trained on a large amount of historical dialog session data, improves the performance of the query embedder for other tasks that it can be fine-tuned for. Sometimes only small amount of training data is available for particular tasks, for example, only a small number of historical dialogs include rephrase pairs that can be used for training. By pre-training the query embedder using a large amount of historical dialogs, the query embedder incorporates historical information that can enhance its performance in performing the task of query rewriting, identifying friction, identifying the domain, intent, slot type and/or slot value, or other tasks.

The improved system may use training data that is not include human annotations. For example, for the pre-training process, the system may use historical dialog data, without any human annotations, to determine the pre-trained query embedder. For the fine-tuning process, in some cases, the system may also use historical data without any human annotations. Thus, the improved system may require less human effort for training.

The improved system may provide a more desirable user experience. This is due, at least in part, to the fact that the present disclosure's teachings decrease a frequency at which unresponsive actions are performed by a system. By decreasing the instances of such actions being performed, user/system interactions may be improved.

FIG. 1 illustrates a system configured to determine a model to process user inputs according to embodiments of the present disclosure. Although the figures and discussion herein illustrate certain operational steps of the system in a particular order, the steps described may be performed in a different order (as well as certain steps removed or added) without departing from the intent of the disclosure. As illustrated in FIG. 1, the system may include device 110 local to a user 5, in communication with one or more systems 120 across one or more networks 199.

The system(s) 120 determines (132) a first dataset for pre-training that includes data corresponding to historical dialog sessions between the system and various users. The system(s) 120 may determine data from profile storage 270 that corresponds to interactions between a user and the natural language processing (NLP) system(s) 120. The system(s) 120 may determine to include in the first dataset dialog sessions that involve at least two utterances from the user and one system-generated response. The system(s) 120 may determine to include in the first dataset dialog sessions that involve no more than six utterances from the user. The system(s) 120 may determine to include dialog session data corresponding to multiple different dialogs and corresponding to multiple user profiles. The first dataset may include text data representing the dialog session data. For example, the first dataset may include first text data representing a first utterance of a first dialog session corresponding to a first user profile, second text data representing a first system-generated response of the first dialog session, third text data representing a second utterance of the first dialog session, and so on. The first dataset may further include fourth text data representing a first utterance of a second dialog session corresponding to a second user profile, and so on. The first dataset may further include fifth text data representing a first utterance of a third dialog session corresponding to the first user profile. In this manner, the first dataset for pre-training includes dialog session data for multiple different dialogs from multiple different users.

Figure 8:
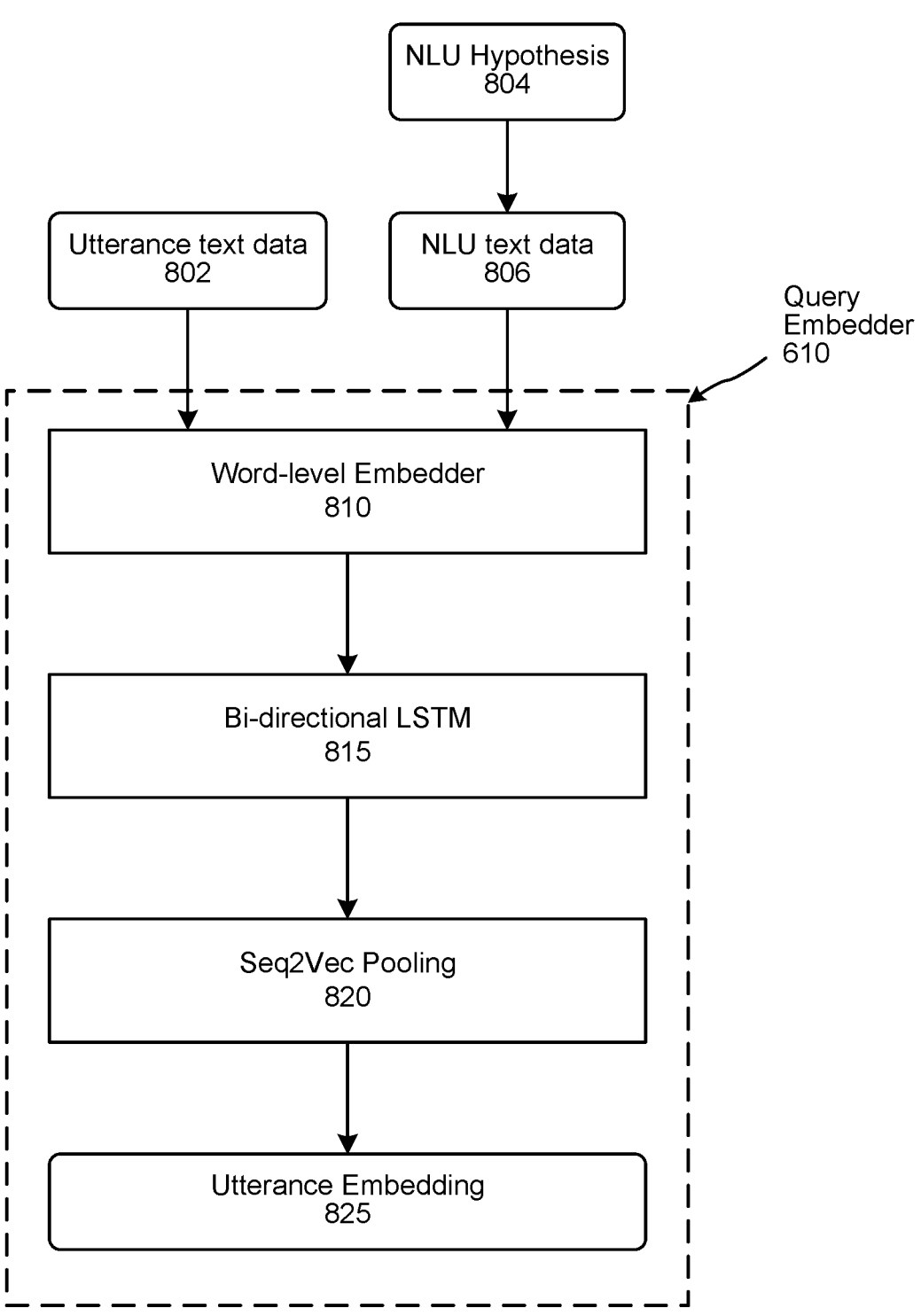
FIG. 8 is a conceptual diagram of the query embedder components according to embodiments of the present disclosure.

The system(s) 120 processes (134) the first dataset to determine first model data corresponding to a first model. The system(s) 120 in this manner determines the first machine-learning model that is the pre-trained model (also referred to as the pre-trained query embedder). The first model data may represent weights, parameters, and other data related to the first model. In some embodiments, the first model employs an encoder architecture, as shown in FIG. 8, and may be referred to as a query embedder. Using the pre-training data, the first model learns to incorporate historical dialog data and contextual information, and is configured to predict the next/subsequent utterance given a first utterance in a dialog session.

In some embodiments, the first dataset includes NLU hypothesis data corresponding to the utterances, and the first model is configured to predict the next/subsequent NLU hypothesis given a first NLU hypothesis in a dialog session.

Further details on how the first model is determined are described in connection with FIG. 7. In some embodiments, the first model data is stored as the pre-trained model and may be used later for further processing.

The system(s) 120 determines (136) a second dataset for fine-tuning the first model. The second dataset may correspond to the task that the first model is to be configured for. In the example process of FIG. 1, the task is query rewriting. The system(s) 120 may determine the second dataset to include rephrase utterance pairs, where the first utterance of the pair is an initial input that results in an undesired response from the system, and the second utterance is a rephrase of the initial input that results in the desired response to the initial input. For example, the initial input as determined by the ASR component may be "play launa's x, old time road" and the rephrased utterance that results in the desired response may be "play lil nas x old town road."

The second dataset may include text data representing the rephrase utterance pairs. For example, the second dataset may include first text data representing a first initial utterance, second text data representing a first rephrase utterance corresponding to the first initial utterance, third text data representing a second initial utterance, fourth text data representing a second rephrase utterance corresponding to the second initial utterance, and so on. The rephrase utterance may also be referred to as an alternative representation of a user input, an alternative utterance or a rewrite utterance. The second dataset may include rephrase utterance pairs from multiple different user profiles, for example, the first rephrase utterance pair may correspond to a first user profile, in that the first user associated with the first user profile provided the first initial utterance. In some embodiments, the corresponding first rephrase utterance may be provided by the first user during the same dialog session. In some embodiments, the first rephrase utterance may be determined by the system using query rewriting techniques described herein. In this manner, the second dataset includes data relating query rewriting.

In other cases, the second dataset for fine-tuning may include data relating to candidate alternative representations of a user input, friction data, user-specific data, or other data relating to other types of tasks. Details of the different tasks the system(s) 120 may be configured to perform are described in relation to FIGS. 9-12.

Errors in ASR resulting the system to misunderstand what the user said may be due to the audio data including background noise, the user having an accent, or other reasons. The NLU component can misinterpret the intent and slot values due to ambiguity in the user input and due to ASR errors. As used herein, an undesired response may refer to occurrence of an error when processing an input, such as an error in ASR or NLU that causes the system to output "I am sorry I don't understand," or "I cannot complete your request," or other responses indicating the system is unable to process the user input. An undesired response may also refer to the system providing an output that is not responsive to the user input because the system misunderstood the user input. For example, the user input may be "What is the weather in Boston?" and the system may provide the weather for Austin.

The system(s) 120 processes (138) the first model data and the second dataset to determine a second model and second model data corresponding to the second model. The second machine-learning model may represent the fine-tuned model that the system can use for a particular task, in this case, for query rewriting. The second model data may represent the weights, parameters and other data relating to the second model. The system(s) 120 may update the weights, parameters and other data relating to the first model (represented by the first model data) to determine the weights, parameters and other data relating to the second model based on the second dataset. In this manner, the system(s) 120 may fine-tune the first model to determine the second model. The system(s) 120 may store the second model data for later use and for processing of incoming user inputs, and the second model may be referred to as the query rewriting model. The components of the second model are similar to the first model, in that, it also employs an encoder architecture shown in FIG. 8, and may be referred to as a query embedder. In some embodiments, the second model may be configured to determine an alternative representation for a user input so that it results in a desired response to the user input. In some embodiments, the second model may determine the alternative representation based on a semantic similarity between the user input and the alternative representation. In some embodiments, the second model may be configured to determine query embedding data corresponding to a user input, and the system(s) 120 may process the query embedding data to determine the alternative representation for the utterance. As used herein, fine-tuning a model (or a pre-trained model) refers to making adjustments to learned weights and parameters of a previously trained model/pre-trained model using a dataset that may be different than the dataset used for training the previously trained model/pre-trained model.

The system(s) 120 receives (140) input data. The input data may be audio data that includes a user input/utterance spoken by the user 5 and captured by the device 110. The system(s) 120 may perform automatic speech recognition (ASR) using the audio data to determine text data representing the user input. The text data may be an ASR hypothesis corresponding to the user input. ASR may be performed on the audio data as described in detail below. In some embodiments, the input data may be text data received via a device 110. In some embodiments, the input data may be other types of user inputs, such as, keyboard input, mouse clicks, touchscreen input, selection of displayed information/graphical elements, etc. The system(s) 120 may determine a natural language representation of the input data for further processing.

The system(s) 120 processes (142) the input data using the second model. The system(s) 120 may process the text data representing the user input using the second model. The system(s) 120 determines (144) alternative data corresponding to the input data. The second model may output model data that may be used to determine the alternative data. The alternative data represents an alternative representation for the user input, which results in successful processing and a desired response to the user input. The second model may output data representing the alternative representation based on a semantic similarity between the alternative representation and the user input. In some embodiments, the alternative data may be text data representing an alternative representation of the user input. In some embodiments, may be embedding data, data representing a domain, intent, slot type, and/or slot value, or other types of data corresponding to an alternative representation of the user input.

The system(s) 120 generates (146) output data using the alternative data. In some embodiments, the system(s) 120 may send the alternative data to the NLU component for further processing. In some embodiments, the system(s) 120 may determine an intent, slot and entity values corresponding to the alternative representation of the utterance and perform the appropriate action corresponding to the alternative representation. In some embodiments, the system(s) 120 may confirm with the user to proceed with the alternative representation by using TTS processing and the text data representing the alternative representation of the user input.

A model for other systems may be trained using labeled training data in the form of pairs of the original query and the rephrased query, however, such dataset for training is expensive to obtain and a model typically needs a large number of rephrase pairs for training in order to achieve generalized performance (performance not biased toward particular types of rephrasing). To enhance performance of a model for NLP related tasks, in particular to reduce friction in a user interaction, the system(s) 120 pre-trains a query embedder using the NLP system's large amount of historical dialog session data (e.g., the first dataset). One dialog session may be defined as a sequence of utterances spoken by one user during an engagement with a voice assistant/NLP system where the time delay between any two consecutive utterances is at most 45 seconds. In addition, each utterance in a dialog session may be associated with its NLU hypothesis generated by the NLU component, labeling the domain, intent and slots (slot types/values) for the utterance. For example, a first turn in a dialog session may be "play lonely eyes old time road" and the corresponding NLU hypothesis may be {Domain: Music, Intent: PlayMusic, SongName: lonely eyes old time road}. The system(s) 120 may then fine-tune the model using a dataset including utterance rephrase pairs (e.g., the second dataset).

Although the operations herein are described as determining a model(s), a pre-trained model and/or a fine-tuned model(s), it should be understood that the system(s) 120 may use similar operations to determine a component(s), an algorithm(s), software code, an application(s), a module(s) or otherwise data that is configured using the first dataset and the second dataset as described herein, and used to perform a particular task with respect to a user input.

The system may operate using various components as illustrated in FIG. 2. The various components may be located on the same or different physical devices. Communication between various components may occur directly or across a network(s) 199. In some embodiments, one or more the components described in relation to system(s) 120 may be implemented at a local device/user device (e.g., device 110) in addition to or instead of the system(s) 120.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wake-words for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The device 110 may send text data 213 to the server(s) 120. Upon receipt by the server(s) 120, the text data 213 may be sent to the orchestrator component 230, which may send the text data 213 to the NLU component 260.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile.

For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The ASR engine 258 may return an N-best list of paths along with their respective recognition scores, corresponding to the top N paths as determined by the ASR engine 258. An application (such as a program or component either internal or external to the ASR component 250 that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

Figure 3:
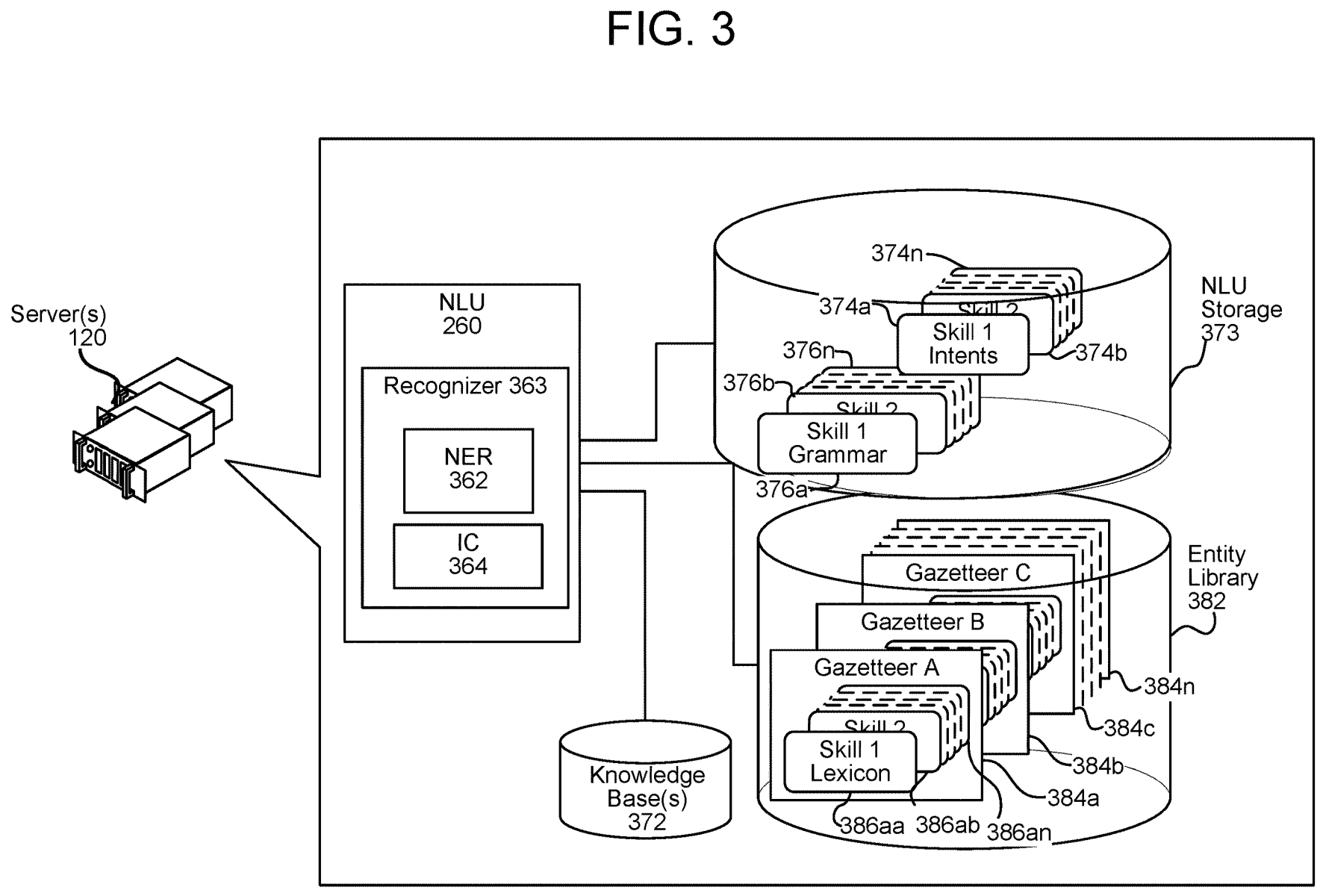

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, skill server(s) 225, etc.) to complete that action.

The NLU component 260 may process text data including several ASR hypotheses. The NLU component 260 may process all (or a portion of) the ASR hypotheses input therein. Even though the ASR component 250 may output multiple ASR hypotheses, the NLU component 260 may be configured to only process with respect to the top scoring ASR hypothesis.

The NLU component 260 may include one or more recognizers 363. Each recognizer 363 may be associated with a different skill 290. Each recognizer 363 may process with respect to text data input to the NLU component 260. Each recognizer 363 may operate at least partially in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a skill 290. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include skill-indexed lexical information associated with a particular skill user and/or device 110. For example, a Gazetteer A (384a) includes skill-indexed lexical information 386aa to 386an. A user's music skill lexical information might include album titles, artist names, and song names, for example, whereas a user's contact list skill lexical information might include the names of contacts. Since every user's music collection and contact list is presumably different, this personalized information improves entity resolution.

An NER component 362 applies grammar models 376 and lexical information 386 to determine a mention of one or more entities in text data. In this manner, the NER component 362 identifies "slots" (corresponding to one or more particular words in text data) that may be used for later processing. The NER component 362 may also label each slot with a type (e.g., noun, place, city, artist name, song name, etc.).

Each grammar model 376 includes the names of entities (i.e., nouns) commonly found in speech about the particular skill 290 to which the grammar model 376 relates, whereas the lexical information 386 is personalized to the user and/or the device 110 from which the user input originated. For example, a grammar model 376 associated with a shopping skill may include a database of words commonly used when people discuss shopping.

Each recognizer 363 may also include an intent classification (IC) component 364. An IC component 364 parses text data to determine an intent(s). An intent represents an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374.

The intents identifiable by a specific IC component 364 are linked to skill-specific grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (e.g., implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb, which an IC component 364 may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 372). For example, if the text data includes "play songs by the rolling stones," after failing to determine an album name or song name called "songs" by "the rolling stones," the NER component 362 may search the database for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {skill} Music, {intent}<PlayMusic>, {artist name} rolling stones, {media type} SONG, and {song title} mother's little helper. For further example, the NER component 362 may tag "play songs by the rolling stones" as: {skill} Music, {intent}<PlayMusic>, {artist name} rolling stones, and {media type} SONG.

Figure 4:
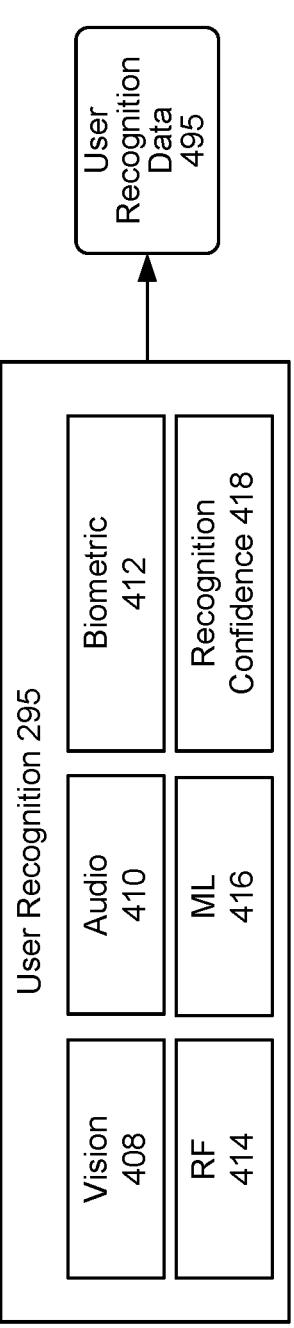
FIG. 4 is a schematic diagram of an illustrative architecture in which sensor data is combined to recognize one or more users according to embodiments of the present disclosure.

The system(s) 120 may include a user recognition component 295 that recognizes one or more users using a variety of data. As illustrated in FIG. 4, the user recognition component 295 may include one or more subcomponents including a vision component 408, an audio component 410, a biometric component 412, a radio frequency (RF) component 414, a machine learning (ML) component 416, and a recognition confidence component 418. In some instances, the user recognition component 295 may monitor data and determinations from one or more subcomponents to determine an identity of one or more users associated with data input to the system(s) 120. The user recognition component 295 may output user recognition data 495, which may include a user identifier associated with a user the user recognition component 295 believes originated data input to the system(s) 120. The user recognition data 495 may be used to inform processes performed by various components of the system(s) 120.

The vision component 408 may receive data from one or more sensors capable of providing images (e.g., cameras) or sensors indicating motion (e.g., motion sensors). The vision component 408 can perform facial recognition or image analysis to determine an identity of a user and to associate that identity with a user profile associated with the user. In some instances, when a user is facing a camera, the vision component 408 may perform facial recognition and identify the user with a high degree of confidence. In other instances, the vision component 408 may have a low degree of confidence of an identity of a user, and the user recognition component 295 may utilize determinations from additional components to determine an identity of a user. The vision component 408 can be used in conjunction with other components to determine an identity of a user. For example, the user recognition component 295 may use data from the vision component 408 with data from the audio component 410 to identify what user's face appears to be speaking at the same time audio is captured by a device 110 the user is facing for purposes of identifying a user who spoke an input to the system(s) 120.

The overall system of the present disclosure may include biometric sensors that transmit data to the biometric component 412. For example, the biometric component 412 may receive data corresponding to fingerprints, iris or retina scans, thermal scans, weights of users, a size of a user, pressure (e.g., within floor sensors), etc., and may determine a biometric profile corresponding to a user. The biometric component 412 may distinguish between a user and sound from a television, for example. Thus, the biometric component 412 may incorporate biometric information into a confidence level for determining an identity of a user. Biometric information output by the biometric component 412 can be associated with specific user profile data such that the biometric information uniquely identifies a user profile of a user.

The RF component 414 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 414 the strength of the signal (e.g., as a received signal strength indication (RSSI)). The RF component 414 may use the RSSI to determine an identity of a user (with an associated confidence level). In some instances, the RF component 414 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 416 may track the behavior of various users as a factor in determining a confidence level of the identity of the user. By way of example, a user may adhere to a regular schedule such that the user is at a first location during the day (e.g., at work or at school). In this example, the ML component 416 would factor in past behavior and/or trends in determining the identity of the user that provided input to the system(s) 120. Thus, the ML component 416 may use historical data and/or usage patterns over time to increase or decrease a confidence level of an identity of a user.

In at least some instances, the recognition confidence component 418 receives determinations from the various components 408, 410, 412, 414, and 416, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 495.

The audio component 410 may receive data from one or more sensors capable of providing an audio signal (e.g., one or more microphones) to facilitate recognition of a user. The audio component 410 may perform audio recognition on an audio signal to determine an identity of the user and associated user identifier. In some instances, aspects of the system(s) 120 may be configured at a computing device (e.g., a local server). Thus, in some instances, the audio component 410 operating on a computing device may analyze all sound to facilitate recognition of a user. In some instances, the audio component 410 may perform voice recognition to determine an identity of a user.

The audio component 410 may also perform user identification based on audio data 211 input into the system(s) 120 for speech processing. The audio component 410 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 410 may perform user recognition by comparing speech characteristics represented in the audio data 211 to stored speech characteristics of users (e.g., stored voice profiles associated with the device 110 that captured the spoken user input).

The system(s) 120 may also include a defect reduction component 275 configured to reduce errors, undesired responses and other defects related to processing a user input (e.g., audio data 211 and text data 213). The defect reduction component 275 may include various components implementing various functionalities to reduce defects. The defect reduction component 275 may enable the system(s) 120 to be more data-efficient by enabling a feedback-based self-learning system that automatically learns and corrects defects without the need of human annotators/human annotated data. In some embodiments, the defect reduction component 275 may determine an alternative representation of a user input, and may confirm with the user to proceed with the alternative representation. Based on the user feedback, the defect reduction component 275 may update one or more functionalities, components and/or models. For example, for a user input "what is the weather in Boston?" the defect reduction component 275 may determine (as described below) that an alternative representation of the user input is "what is the weather in Austin?" The system(s) 120 may ask the user if the weather for Boston or Austin was requested, or in some cases, the system(s) 120 may ask the user to confirm that the weather for Austin was requested. The user may respond "Austin" or "yes, I want the weather for Austin." Based on this feedback, the defect reduction component 275 may associated the user input "what is the weather in Boston" with an alternative representation "what is the weather in Austin." In some cases the defect reduction component 275 may make this association for a particular user profile or particular group of user profiles. In another example, the user input may be "play maj and dragons" and the defect reduction component 275 may determine, using stored alternative representations that "play imagine dragons" may be an alternative representation for this input. The system(s) 120 may confirm the alternative representation via implicit feedback, where the user does not provide negative feedback in response to the output generated using the alternative representation. For a subsequent user input (from the same user or a different user) of "can you play maj and dragons", the defect reduction component 275 may determine, using stored alternative representations that an alternative representation for the user input may be "play imagine dragons," and may generate output using that alternative representation.

The defect reduction component 275 may store alternative representations for a past user input using various methods. In some embodiments, the defect reduction component 275 may determine an indexed data table of past user inputs and alternative representations enabling other components, such as the alternate input service component 285, to search and retrieve past user inputs and alternative representations that may be semantically similar to a current user input. In some embodiments, the defect reduction component 275 may determine a probabilistic graph mapping a past user input to one or more alternative representations. The defect reduction component 275 may update the table, the graph and other data stores to include other past user inputs and other alternative representations, without having to update the functionality or code for the various components (e.g., the alternate input service component 275) that may use the stored data to process a current user input.

The system(s) 120 may also include an alternate input service component 285 as part of the defect reduction component 275. The alternate input service component 285 may receive text data/ASR hypothesis representing a user input, and determine alternative text data representing the user input, where the alternative text data is known to be successfully processed by the NLU component and cause the system to output a desired response. In some embodiments, the alternate input service component 285 may output a ranked list of alternative representations for the utterance. In some embodiments, the alternate input service component 285 may determine an alternative representation for the utterance using user-specific data. In some embodiments, the alternate input service component 285 may determine if the text data representing the user input will cause an undesired response.

Figure 5:
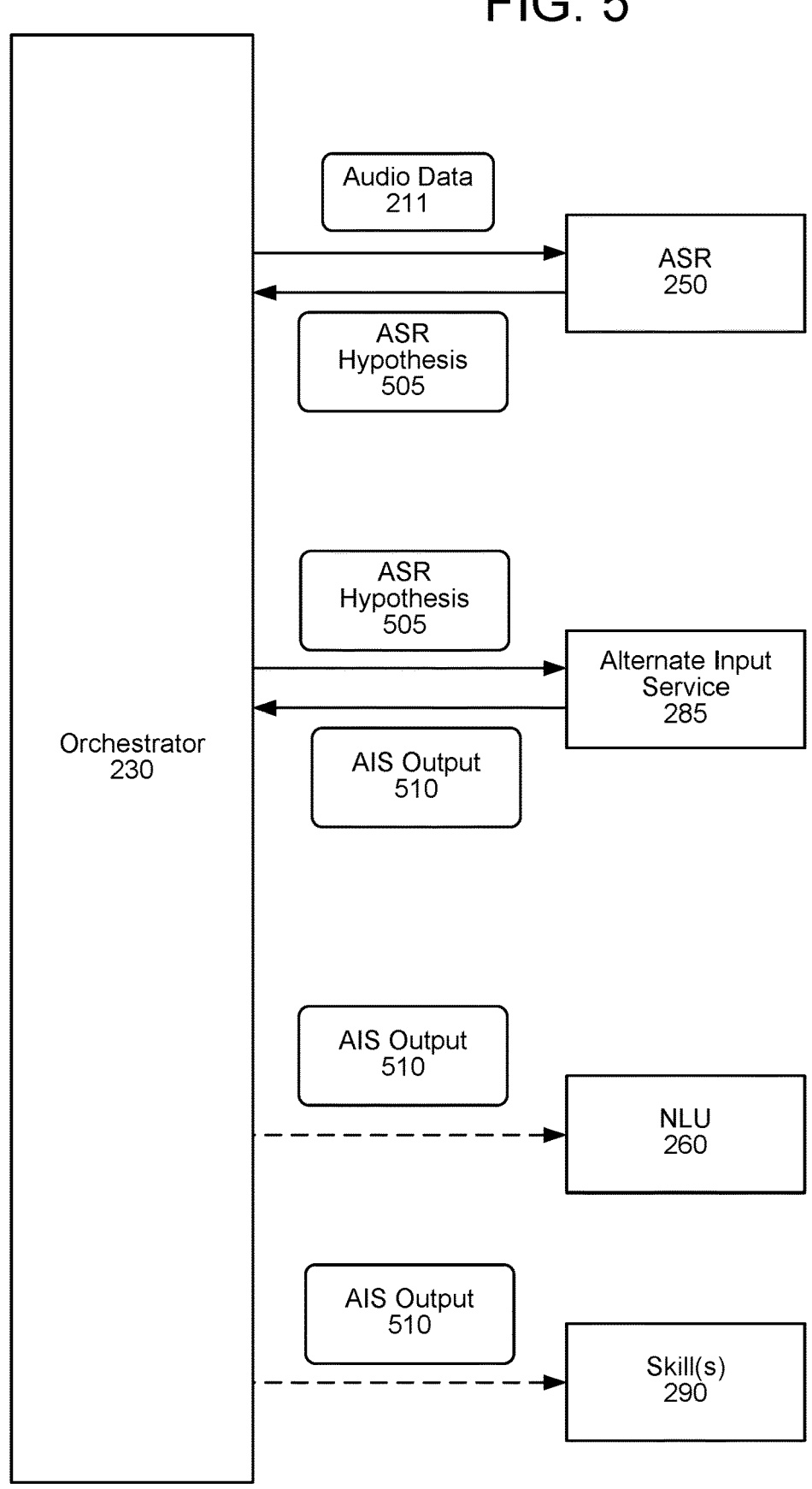
FIG. 5 is a conceptual diagram illustrating how user inputs may be processed at runtime using an alternate input service according to embodiments of the present disclosure.

FIG. 5 conceptually illustrates how user inputs may be processed during runtime using the alternate input service component 285 according to embodiments of the present disclosure. If a user input is received as audio 11 (e.g., is a spoken user input), the orchestrator component 230 may send audio data 211, representing the audio 11, to the ASR component 250. The ASR component 250 may transcribe the audio data 211 into an ASR hypothesis 505, which the ASR component 250 may send to the orchestrator component 230.

The orchestrator component 230 may send the ASR hypothesis 505 to the alternate input service 285. The alternate input service 285 may process the ASR hypothesis 505 to determine whether the ASR hypothesis 505 should be rephrased.

The alternate input service 285 may implement a trained model (configured as described in relation to FIG. 7) to determine whether the present user input should be rephrased. For example, the alternate input service 285 may process an ASR hypothesis to determine whether the ASR hypothesis is similar to previous user inputs that were rephrased or resulted in an NLU processing error.

The alternate input service 285 generates alternate input service (AIS) output data 510. The AIS output data 510 may be text data representing an alternate representation of the user input represented by ASR hypothesis 505. The alternate input service 285 may output an alternate representation of the user input if it is determined, using the trained model 610, that the ASR hypothesis 505 will cause an undesired response to the user input.

The AIS output data 510 may be text data representing the ASR hypothesis 505. The alternate input service 285 may output the ASR hypothesis 505 as the AIS output data 510 if it is determined that the ASR hypothesis 505 will result in the desired response to the user input.

In some embodiments, the AIS output data 510 may also include intent data and/or slot data corresponding to the text data (the alternate text or the ASR hypothesis text). The orchestrator 230 may send the AIS output data 510 to the NLU component 260 to determine the corresponding intent data and slot data corresponding (if 510 does not already include it). Alternatively, the orchestrator 230 may send the AIS output data 510 to one or more skill(s) 290 for processing and executing a corresponding action.

The alternate input service 285 may implement one or more trained models (generated as described in relation to FIG. 7) to determine alternative text data representing the user input.

In some embodiments, the alternate input service 285 may consider personalized context information for a user (associated with the user input) when determining an alternative representation for the user input. The personalized context information may be rephrase pairs corresponding to the particular user profile that provided the user input. The personalized context information may also include other user profile data, such as, user preferences, device types, device identifiers, historic user interaction data, contacts data, and other data.

When a user input is received by a device 110, the device 110 may generate a user input identifier corresponding to the user input. The system may maintain a record of processing performed with respect to the user input using the user input identifier. For example, the audio data 211 may be associated with the user input identifier when the orchestrator component 230 sends the audio data 211 to the ASR component 250; the ASR hypothesis 505 may be associated with the user input identifier when the ASR component 250 sends the ASR hypothesis 505 to the orchestrator component 230; the ASR hypothesis 505 may be associated with the user input identifier when the orchestrator component 230 sends the ASR hypothesis 505 to the alternate input service 285; the MS output data 510 may be associated with the user input identifier when the alternate input service 285 sends the AUS output data 510 to the orchestrator component 230; the AIS output data 510 may be associated with the user input identifier when the orchestrator component 230 sends the AIS output data 510 to the NLU component 260; the AIS output data 510 may be associated with the user input identifier when the orchestrator component 230 sends the AIS output data 510 to the skill(s) 290; etc.

As described above, the alternate input service 285 may receive an ASR hypothesis 505 when the user input is a spoken user input. One skilled in the art will appreciate that the alternate input service 285 may receive text data (representing a text based user input) and may process as described above with the text based user input without departing from the present disclosure.

Figure 6:
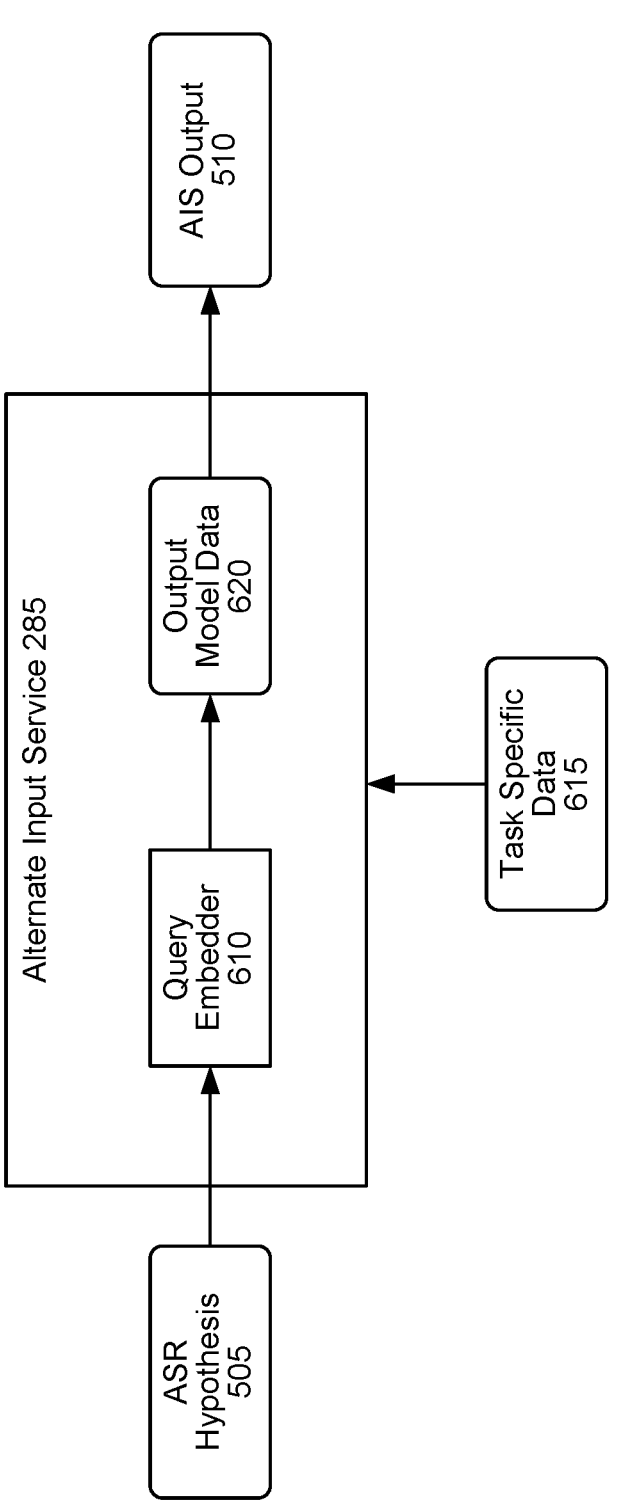
FIG. 6 is a conceptual diagram of alternate input service components including a query embedder according to embodiments of the present disclosure.

FIG. 6 is a conceptual diagram of alternate input service components including a trained model, in this case, a query embedder 610 according to embodiments of the present disclosure. The alternate input service 285 may be configured to perform one or more tasks for reducing friction when a user is engaged in a dialog with a speech-controlled device or a voice assistant system (e.g., the device 110). One task may involve query rewriting, where given an input utterance, the alternate input service component 285 determines an alternative representation of an utterance that is a rewrite or rephrase of the input utterance and that results in the desired response for the input utterance. In another task involving personalized query rewriting, the alternate input service component 285 may determine an alternative representation for an input utterance using user-specific data. In another task involving query rewriting, the alternate input service component 285 may determine a ranked list of candidate alternative representations. In yet another task, the alternate input service component 285 may determine whether an input utterance will cause friction.

The query embedder 610 may be generated as described in connection with FIG. 7. For example, the query embedder 610 may be pre-trained using historical dialog session data, and then fine-tuned for a particular task using a fine-tuning dataset related to the task. There may be multiple different versions of the query embedder 610 stored in data storage, where each version may correspond to a particular task, in that the respective query embedder 610 may be configured to perform the particular task. The alternate input service component 285, in some embodiments, may determine which task is to be performed and may retrieve the appropriate version of the query embedder 610 from the data storage for use during runtime. For example, the data storage may include a first query embedder 610a that is fine-tuned for a query rewriting task as described in relation to FIG. 9, a second query embedder 610b that is fine-tuned for a personalized query rewriting task as described in relation to FIG. 10, a third query embedder 610c that is fine-tuned for ranking candidate alternative representations as described in relation to FIG. 11, and a fourth query embedder 610d that is fine-tuned for determining whether an input utterance will cause friction as described in relation to FIG. 12.

During runtime, the alternate input service component 285 receives an ASR hypothesis 505 from the orchestrator 230 or from the ASR component 250. The ASR hypothesis 505 may be text data representing a current user input/utterance associated with a dialog session. In some embodiments, the alternate input service component 285 may also receive data relating to utterance(s)/input(s) of previous turn(s) within the dialog session. For example, if the current utterance is spoken by the user during turn N, then the alternate input service component 285 may receive data (e.g., ASR hypothesis, text data, NLU hypothesis, system-generated response, skill(s) invoked, outcome/output responsive to the utterance, etc.) corresponding to the previous utterance(s) spoken by the user during the previous turn N−1 of the dialog session. The utterances within the dialog session may be identified using a dialog session identifier associated with the dialog session. The alternate input service component 285 may also receive other contextual data relating to the dialog session, such as device identifier, device type, manner in which dialog was initiated, etc. The alternate input service component 285 may also receive user profile data corresponding to the user that spoke the current utterance, where the user profile data may include location data, user preferences, historical dialog session data for the user, historical user interactions data, etc. The user may be identified using the techniques described in relation to FIG. 4.

The alternate input service component 285 may also receive task-specific data 615 that may be used to perform the particular task. Further details on the task-specific data for various tasks are described in relation to FIGS. 9, 10, 11, and 12. For example, for the query rewriting task, the task-specific data 615 may be indexed rephrase utterance pairs representing historical rephrase utterance pairs corresponding to multiple different user profiles. In another example, for the personalized query rewriting task, the task-specific data 615 may be rephrase utterance pairs corresponding to the user profile associated with the user that provided the input utterance being processed during runtime.

The query embedder 610 may determine output model data 620, and the alternate input service component 285 may process the output model data 620 to determine the AIS output 510. In some embodiments, the output model data 620 may be an alternative representation or alternative text data representing the alternative utterance. As described herein, an alternative utterance/alternative representation of an utterance is a rewrite or rephrase of the input utterance that results in the desired response to the input utterance. In some embodiments, the output model data 620 may include scores corresponding to candidate alternative representations, and the AIS output 510 may be a ranked list of candidate alternative representations. In some embodiments, the output model data 620 may be a probability score indicating a likelihood of the input utterance resulting in friction/an undesired response from the system, and the AIS output 510 may be an indication on whether the input utterance should be rewritten/rephrased or not. In some embodiments, the AIS output 510 may be the ASR hypothesis 505 if the alternate input service component 285 determines that the ASR hypothesis 505 will result in the response desired by the user.

As described in relation to FIG. 5, the AIS output 510 may be provided to the NLU component 260 for further processing. In some embodiments, the AIS output 510 may be provided to a skill(s) 290 for further processing.

FIG. 7A is a conceptual diagram of building the query embedder using a pre-training dataset according to embodiments of the present disclosure. FIG. 7B is a conceptual diagram of fine-tuning the pre-trained query embedder using a fine-tuning dataset according to embodiments of the present disclosure. FIG. 8 is a conceptual diagram of the query embedder components according to embodiments of the present disclosure.

The alternate input service component 285 may include the model building components 710, 715. In some embodiments, the model building components 710, 715 may be separate components included in the system(s) 120. The model building component 710 may train one or more machine learning models using the dialog session dataset 702 to predict the next utterance in a dialog session given a previous utterance. The model building component 710 is configured to perform the pre-training process described herein and determine the pre-trained model 720. The model building component 710 may train the one or more machine learning models during offline operations. In some embodiments, the pre-trained model 720 may be also referred to as the pre-trained query embedder 720. The model building component 710 may determine the model data 722 corresponding to the pre-trained query embedder 720, where the model data 722 may represent the weights, parameters and other data corresponding to the pre-trained model 720.

The dialog session dataset 702 may also be referred to as the pre-training dataset. In some embodiments, the pre-training dataset used by the model building component 710 may include dialog session data 702 corresponding to multiple different user interactions with the device 110. As used herein, a "dialog session" may refer to a set of user inputs and corresponding system outputs while a user interacts with a device 110. The user inputs may be in the form of spoken input/utterances, text input, touchscreen input, selection of a graphical element(s) on the screen, pressing a button, keyboard input, mouse clicks, gestures, and other forms of user inputs or combinations thereof may be included in a dialog session. When the system(s) 120 receives a user input, the system(s) 120 may associate the data (e.g., audio data or text data) representing the user input with a dialog session identifier. The dialog session identifier may be associated with various speech processing data (e.g., an intent indicator(s), a category of skill to be invoked in response to the user input, etc.). The output or action performed by the system(s) 120 in response to the user input may also be associated with the dialog session identifier and be identified as part of the particular dialog session. The system(s) 120 may receive one or more additional/subsequent user inputs, after the system generates an output or performs an action in response to the initial user input. The additional user inputs may be identified as being part of the same dialog session and associated with the same dialog session identifier. The system(s) 120 may determine the additional user inputs are part of the same dialog session based on the time elapsed between the initial user input and the additional user input. In other embodiments, the system(s) 120 may determine the additional user inputs are part of the same dialog session based on the intent and/or slot data of the additional user inputs being the same or similar to the intent and/or slot data of the initial user input. For example, an initial user input of "play maj and dragons" may be associated with a first dialog session identifier. The system(s) 120 may process the user input and determine an error during NLU processing, resulting in a system-generated audio output of "I am sorry, I do not understand" that is associated with the first session identifier. The system(s) may subsequently receive the user input "play Imagine Dragons," which is associated with the first dialog session identifier based on the system(s) 120 receiving it within a predefined time period of the initial user input. In another example, an initial user input may be "Alexa, make a restaurant reservation for 2 people at ABC restaurant for 7 pm tomorrow," the system-generated response may be "I have made the reservation at ABC restaurant," and the subsequent user input may be "Book me a ride to the restaurant tomorrow," and the system-generated response may be "I have reserved a car for you." Text data representing the user inputs and the system-generated responses may be included in the pre-training dataset 702. The initial user input and system-generated response relating to the restaurant reservation may be referred to as one turn of the dialog, and the subsequent user input and system-generated response relating to reserving a car may be referred to as another turn of the dialog. Thus, the pre-training dataset 702 may include, for example, the initial user input, the system-generated response, and the subsequent user input.

The dialog session dataset 702 may include historical dialog session data corresponding to multiple different user profiles representing interactions between the NLP system and multiple different users. The dialog session dataset 702 may be a large dataset, and may include historical dialog session data captured by the NLP system(s) 120 over a given time period (e.g., a month, a few weeks, etc.).

The pre-trained query embedder 720 and the model data 722 may be stored for later use, for example, for fine-tuning for a particular task. The pre-trained query embedder 720 may be updated or modified after sometime, when more dialog session data has been captured by the NLP system.

The query embedder may require a considerable amount of training data to achieve good and generalized performance for a task like query rewriting. However, a large amount of annotated query rephrase data may not be available. The improved system of the present disclosure employs a pre-training process before fine-tuning the model with a task-specific dataset, such as utterance rephrase pairs. In particular, the system uses the pre-training process at the utterance level by leveraging a large quantity of historical dialog session data, and enables the pre-trained model to incorporate a large amount of contextual information available via the historical dialog session data.

In some embodiments, the model is pre-trained using utterance text data included in the dialog session dataset 702. The historical user interactions contain a lot of information and may also contain useful user implicit feedback. The pre-trained model 720 using such data may incorporate the historic/prior information helpful for generalization. In some cases, the pre-training of the model 720 is considered as a language modeling problem at the utterance level, where given the current utterance $u_t^{(s)}$ of a dialog session s, the model 720 is configured to predict the utterance for the next/subsequent turn in the dialog session ($p\ u_{t+1}^{(s)}|u_t^{(s)}$).

In some embodiments, the model is pre-trained in a joint manner using utterance text data and corresponding NLU hypotheses. The NLU component 260 may provide a semi-structured semantic representation for utterances, where utterances of various text forms but the same semantics can be grouped together through the same NLU hypothesis. For example, user inputs "could you please play imagine dragons", "turn on imagine dragons", "play songs from imagine dragons" carry the same semantics and have the same NLU hypothesis, but their utterance texts are different. Thus, augmenting the utterance texts with the less noisy NLU hypotheses may enhance the pre-trained model 720 performance. Another reason to include NLU hypotheses in the pre-training is that the NLU data may not be available during runtime, because, in some embodiments, the alternate input service component 285 executes between the ASR component 250 and the NLU component, as shown in FIG. 5. Thus, the joint pre-training using utterance text and NLU hypotheses will preserve the information from the NLU hypothesis into the utterance embeddings and make use of them during runtime.

The pre-trained model 720 jointly trained on utterance text and NLU hypotheses may be configured to project the query and its NLU hypothesis to the same space, therefore serving as a way of regularization or weak supervision. The jointly pre-trained model 720 may be configured to perform four prediction tasks including predicting the utterance for the next turn in a dialog session ($u_{t+1}^{(s)}$) given a current utterance ($u_t^{(s)}$), predicting the NLU hypothesis for the next turn in a dialog session ($h_{t+1}^{(s)}$) given a current utterance ($u_t^{(s)}$), predicting the utterance for the next turn in a dialog session ($u_{t+1}^{(s)}$) given a current NLU hypothesis ($h_t^{(s)}$), and predicting the NLU hypothesis for the next turn in a dialog session ($h_{t+1}^{(s)}$) given a current utterance ($u_t^{(s)}$).

For this joint training, in some embodiments, the model architecture is the encoder architecture shown in FIG. 8. During training, the input can be either the utterance text form or the NLU hypothesis or both. During runtime, text data representing the input utterance is provided to the query embedder 610.

A NLU hypothesis labels the domain, intent and slots (slot types/values) for an utterance, which are generated by the NLU component 260. The domain may refer to the general topic of an utterance, like "Music", "HomeAutomation", "Knowledge", etc. The intent may reflect the user demand, such as "PlayMusic", "LaunchNativeApp". The slot-types/values are NER results marking the targets of the demand in the utterance, for example, the song name under the "Play-Music" intent, and the application name under the "LaunchNativeApp" intent.

The NLU hypothesis 804 may be serialized to determine text data representing the NLU hypothesis, and the text data representing the NLU hypothesis may be included in the dialog session dataset 702 for pre-training. The domain, intent, slot types and slot values of a hypothesis are serialized as if it is a single sequential text. The system(s) 120 may determine first text data/domain text data representing the domain, second text data/intent text data representing the intent, third text data/slot text data representing the slot type, and fourth text data/slot text data representing the slot values. The system(s) 120 may concatenate the first, second, third and fourth text data to determine the NLU text data 806. For example, the NLU text data 806 may be "music play music artist name lil nas x song name old town road." The query embedder 610 may process the NLU text data 806 in a similar manner as the utterance text data, for example, by first determining word-level embeddings, then processing the word-level embeddings using a bi-directional LSTM, then merging the word-level embeddings using the seq2vec pooling layer.

In some embodiments, the query embedder 610 employs the encoder architecture shown in FIG. 8, including various layers of word-level embedder layer 810, bi-directional LSTM layer 815, and a sequence-to-vector pooling layer 820. Given an input utterance represented by the utterance text data 802, the word-level embedder 810 first determines the word/token level representation of the utterance text data 802. The word-level embedder 810 may be one or more pre-trained contextual word/subword embedding models, such as ELMo, BERT, etc. The query embedder 610 then may include a bi-directional LSTM 815 (or another type of neural network, recurrent neural network, etc.) that processes the word-level embeddings corresponding to the utterance text data 802. The query embedder 610 may use a sequence-to-vector (seq2vec) pooling layer 820 to merge the word-level embeddings and determine an utterance-level embedding 825 that may be represented as a data vector. The word-level embeddings for the words in the utterance text/ the NLU hypothesis text are merged as one single vector representation of that utterance/hypothesis by the pooling layer 820. The seq2vec layer may be implemented by mean-pooling, max-pooling, self-attention, convolution neural network (CNN) pooling, or other types of pooling techniques. In some embodiments, the fine-tuned model may be configured to determine query embedding data corresponding to a user input, and the system(s) 120 may process the query embedding data to determine the alternative representation for the user input.

In some embodiments, the query embedder 610 is a neural retrieval system based on query embeddings, where a neural encoder learns to capture latent syntactic and semantic information from the given query specifically for the query rewriting task. This allows for computing the fixed size vector representation for a large number of rephrase candidates offline. The neural encoder is configured so that the query embedding is close to its corresponding rephrase in the projected space.

Referring to FIG. 7B, the model building component 715 may train one or more machine learning models using the fine-tuning dataset 724 for a particular task. The model building component 715 is configured to perform the fine-tuning process described herein and determine the trained model 610. The model building component 715 may train the one or more machine learning models during offline operations. The model building component 715 may be configured to fine-tune the pre-trained query embedder 720. The model building component 715 may be configured to update or modify the model data 722 based on processing of the fine-tuning dataset 724 to determine the model data 728 corresponding to the query embedder 610. The model building component 710 may determine the model data 728 corresponding to the fine-tuned model 610, where the model data 728 may represent the weights, parameters and other data corresponding to the model 610.

As described herein, the system(s) 120 may fine-tune the query embedder for a particular task by using a fine-tuning dataset 724 that corresponds to the particular task. For the particular task of query rewriting, the query embedder 610 may be fine-tuned using a fine-tuning dataset 724 that includes rephrase utterance pairs. Further details on the different tasks that the query embedder can be fine-tuned for are described in relation to FIGS. 9, 10, 11 and 12. Different versions or instances of the query embedder 610 may be stored for later use during runtime, where each version may correspond to a particular task, in that the respective query embedder 610 may be configured to perform the particular task.

One or more of the layers shown in FIG. 8 may be optional depending on the configuration of the query embedder 610. One or more of the layers shown in FIG. 8 may employ a different type of model(s)/technique(s) to achieve the same or similar output described above with respect to the individual layers and the overall query embedder 610. In some embodiments, all of the layers/components of the query embedder 610 may be fine-tuned using the fine-tuning dataset 724. In some embodiments, only some of the layers/components of the query embedder 610 may be fine-tuned using the fine-tuning dataset 724.

During training (pre-training and fine-tuning), as shown in FIG. 8, the query embedder 610 in some embodiments may process as inputs utterance text data 802 and corresponding NLU text data 806 (determined from the NLU hypothesis 804 corresponding to the utterance represented by the text data 802). In some embodiments, during training the query embedder 610 may only process as input utterance text data 802. During runtime, the query embedder 610 processes as input text data 802 representing the input utterance. The query embedder 610 may not process data relating to a NLU hypothesis during runtime because the alternate input service component 285 may operate after ASR processing and prior to NLU processing, so that the appropriate utterance text is provided to the NLU component enabling the system(s) 120 to generate the desired output.

The utterance embedding data 825 may represent an encoded utterance determined as described above. During training, the system(s) 120 may pre-compute utterance embedding data 825 for multiple alternative representations using the query embedder 610, and may store them for use during runtime. During runtime, the utterance embedding data 825 may be used various task layers to perform a specified task.

In some embodiments, the system(s) 120 may determine another encoder/embedder (e.g., system response embedder) to process the system-generated response(s) of the dialog session. The system response embedder may include components/layers similar to the query embedder 610 shown in FIG. 8. As described herein, a dialog session may include multiple utterances from a user and multiple system-generated responses to the utterances. For example, a dialog session may include the following:

---

Utterance (turn 1): Make a restaurant reservation at ABC.
System-generated response (turn 1): I have made the reservation.
Utterance (turn 2): Book me a ride to the restaurant.
System-generated response (turn 2): I have reserved a car ride for you.

---

In another example, a dialog session may include the following:

---

Utterance (turn 1): Play lonely eyes old time road
System-generated response (turn 1): I am sorry I am unable to play the song lonely eyes old time road
Utterance (turn 2): Play lil nas x old town road
System-generated response (turn 2): <outputs the song "old town road" by artist "lil nasx">

---

In this case, the system(s) 120 may use the query embedder 610 to encode the user utterances at turn 1 and turn 2, and may use a separate system response embedder to encode the system-generated response at turn 1 and turn 2. This may be done during training (pre-training and fine-tuning). This may also be done during runtime, when the system(s) 120 may incorporate previous utterances and previous system-generated responses for the current dialog session that is being evaluated during runtime.

The goal of query rewriting is to reduce friction by finding another form of the input utterance that can be better comprehended by the natural language processing system, in order to better satisfy the user request. The improved system of the present disclosure uses a pre-trained utterance/hypothesis embedder, and fine-tunes the embedder for particular tasks. FIGS. 9-12 describe example processes for particular tasks that can be implemented by the alternate input service component 285 using the query embedder 610.

FIG. 9 is a flowchart illustrating a process for using the query embedder to determine an alternative representation for an input according to embodiments of the present disclosure. The system(s) 120 may have already determined, during pre-training or a first time period, the pre-trained query embedder 720. During fine-tuning or a second time period subsequent the first time period, the system(s) 120 may determine (902) the fine-tuning dataset 724 to include utterance rephrase pairs. As described herein, the fine-tuning dataset may correspond to the particular task the model is being configured for.

The fine-tuning dataset 724 may be determined (902) using data generated by a rephrase detection component. The rephrase detection component may be configured to process historical dialog session data to determine if one or more utterances in the dialog session are a rephrase of the initial utterance. As described herein, two or more utterances are considered to be part of the same dialog session based on the time elapsed between the utterances. The rephrase detection component may make determine the utterance rephrase pairs based on the domain, the intent, the slot type and/slot value being similar or the same between two utterances. The rephrase detection component may also determine the utterance rephrase pairs based on the user indicating that the utterance is a rephrase. The rephrase detection component may also determine the utterance rephrase pairs based on the rephrased utterance resulting the user's desired response. In some embodiments, the fine-tuning dataset 724 may also include the NLU hypothesis for the rephrased. The fine-tuning dataset 724 may include text data representing the utterance rephrase pairs and the corresponding NLU hypotheses. In non-limiting examples, the fine-tuning dataset 724 may include the following text data corresponding to one dialog session:

---

Utterance (turn 1): play lonely eyes old time road
   NLU hypothesis: Domain <Music> | Intent <PlayMusic> | SongName <lonely eyes old time road>
Utterance (turn 2): play luna's x old time road
   NLU hypothesis: Domain <Music> | Intent <PlayMusic> | ArtistName <luna's x> | SongName <old time road>
Utterance (turn 3): play launa's x old time road
   NLU hypothesis: Domain <Music> | Intent <PlayMusic> | ArtistName <launa's x> | SongName <old time road>
Utterance (turn 4): play lil nas x old town road
   NLU hypothesis: Domain <Music> | Intent <PlayMusic> | ArtistName <lil nas x> | SongName <old time road>

---

In the above example, the rephrase detection component may determine that the utterance at turn 4 is the corrected/alternative representation of the other utterances since the turn 4 utterance resulted in the user's desired response. The fine-tuning dataset may include text data representing the following utterance pairs: {play lonely eyes old time road, play lil nas x old town road}, {play luna's x old time road, play lil nas x old town road}, {play launa's x old time road, play lil nas x old town road}.

Within a dialog session, the system(s) 120 may select utterance pairs that results in a high confidence score from the rephrase detection component. The selected utterance pair may be in the form of (u, u'), where with high confidence that the second query u' is a corrected form of the first unsuccessful query u. For example, the fine-tuning data 724 for the query rewrite task may include {"play ambient mean", "play envy me"} where the rephrase corrects the ASR error, {"play blues radio news", "play blue news radio"} where the rephrase rearranges the words for better clarity, and {"play relax music", "play relaxing music from my playlist} where the rephrase specifies details for the user input.

During the fine-tuning process, the system(s) 120 may determine (904) the model data (weights, parameters, and other data) corresponding to the query embedder 610 to determine the fine-tuned model. The system(s) 120 may determine the model data and the fine-tuned query embedder 610 as described above in relation to FIG. 7B. The system(s) 120 may store the model data and the fine-tuned query embedder 610 as associated with the query rewriting task.

The series of nonlinear transformation performed by the query embedder 610 may be referred to as u=Emd(u), where u is an utterance and u is its final utterance embedding. In order to measure the similarity between u and u', the embedding of two utterances u, u' in the projected space, the scaled cosine distance as shown in Equation (2) may be used, where a is a scaling constant (empirically chosen as $\alpha=16$) and $linear_1$, $linear_2$ are linear transformations on top of u. In comparison to the commonly used dot product, Equation (2) may be viewed as a normalized dot product, and it only encourages smaller angles but not longer embeddings that could be geometrically far apart from each other in the Euclidean space.

$$\Delta(u,u')=\alpha\times\cos(linear_1(u),linear_2(u'))\qquad\text{Equation (2)}$$

For fine-tuning, given a pair (u, u'), where u is the original utterance and u' is its corresponding rephrase, the probability is calculated as:

$$p(u\,|\,u')=\frac{\exp\{\Delta(Emb(u),\,Emb(u'))\}}{\sum_{\tilde{u}\in R}\exp\{\Delta Emb(u),\,Emb(\tilde{u})\}}\qquad\text{Equation (3)}$$

where R is all rephrase candidates.

The system(s) 120 may determine (906) task-specific data 615 for the query rewriting task. In this case, the system(s) 120 may determine the task-specific data 615 to include indexed utterance rephrases/alternative representation candidates, for example, a k-Nearest Neighbor (kNN) index of the alternative representation candidates. The indexed alternative representations may be determined and stored at the defect reduction component 275.

The indexed alternative representation candidates may be from a set of predefined rephrase pairs selected from historical dialog data. The task-specific data 615 may include an index of both the original utterance and the rephrased utterance for a rephrase/rewrite pair. The alternative representation candidates may be encoded offline using the query embedder 610 and added to the kNN index.

In some embodiments, the system(s) 120 may determine that the task-specific data 615 includes a weighted directed graph that models historical utterances and NLU hypotheses data. The nodes in the graph may represent the utterances and corresponding NLU hypotheses and the edge weights may be historical transition probabilities. Given an input utterance, the graph's API is capable of returning a sink node such that the path from the input utterance to the sink node is most probable, and the utterance at the sink node is considered as the rephrase/alternative representation. The graph may be determined and stored at the defect reduction component 275. The number of utterances included in the graph may be limited, and may not be capable of determining an alternative representation for any given/arbitrary utterance if it is not included in the graph. The alternate input service component 285 leverages the graph and the utterance-level embedding generated by the query embedder 610 to determine an alternative representation based on semantic similarities between the utterances represented in the graph and the embedded input utterance. In some embodiments, the utterance-level embeddings for the utterances in the graph are determined/pre-computed using the query embedder 610, and stored for later use during runtime. During runtime, the input utterance is encoded using the query embedder 610 and alternative utterance representations in the graph that are most similar to the input utterance are determined.

During runtime or a third time period subsequent to the second time period, the system(s) 120 may process (908) an input utterance using the fine-tuned query embedder 610 determined in step 904. The system(s) 120 may determine utterance-level embedding data (e.g., 825) corresponding to the input utterance. The system(s) 120 may then determine (910) an alternative representation of the input utterance using the utterance-level embedding data and the task-specific data 615. For example, using the input utterance and other similar utterances in the graph, the system(s) 120 may determine alternative representations for them by traversing the graph. In another example, the system(s) 120 may determine the utterance-level embedding for an input utterance and determine top-k relevant rephrases using the kNN index in the projected space. The system(s) 120 may select one alternative representation for the user input, and may use (912) the alternative representation of the input utterance as the AIS output 510.

FIG. 10 is a flowchart illustrating a process for using the query embedder to determine an alternative representation for an input using user-specific data according to embodiments of the present disclosure. The system(s) 120 may have already determined, during pre-training or a first time period, the pre-trained query embedder 720. During fine-tuning or a second time period subsequent the first time period, the system(s) 120 may determine (1002) the fine-tuning dataset 724 to include utterance rephrase pairs corresponding to a particular user profile. As described herein, the fine-tuning dataset may correspond to the particular task the model is being configured for, in this case, personalized query rewriting.

The system(s) 120 determines (1002) utterance rephrase pairs using the rephrase detection component (as described in relation to FIG. 9). The system(s) 120 may filter the utterance rephrase pairs so that the fine-tuning dataset only includes the utterance rephrase pairs corresponding to a particular user profile or a particular type of user profile. For example, the fine-tuning dataset 724 in this case may include text data representing the following utterance rephrase pair {what is the weather in Boston, what is the weather in Austin}. The example utterance rephrase pair may have been spoken by a first user associated with a first user profile corresponding to a first group of user profiles. The user-specific utterance rephrase pairs may take into account user-specific characteristics, such as the user's accent, etc. The first group of user profiles may correspond to user profiles associated with a particular location/region (e.g., users living in a particular region having a particular accent or particular way of speaking/vocabulary), a particular proficiency in interacting with the natural language processing system, a particular background, a particular preference/interest, particular demographic information, etc.

During the fine-tuning process, the system(s) 120 may determine (1004) the model data (weights, parameters, and other data) corresponding to the query embedder 610 to determine the fine-tuned model. The system(s) 120 may determine the model data and the fine-tuned query embedder 610 as described above in relation to FIG. 7B. The system(s) 120 may store the model data and the fine-tuned query embedder 610 as associated with the personalized query rewriting task for the first user profile or the first group of user profiles.

The system(s) 120 may determine (1006) task-specific data 615 for the personalized query rewriting task to include indexed utterance rephrase pairs (as described in relation to FIG. 9) for the first user profile/the first group of user profiles. In some embodiments, the system(s) 120 may determine that the task-specific data 615 includes a weighted directed graph that models historical utterances and NLU hypotheses data corresponding to the first user profile/the first group of user profiles. In this case, the task-specific data 615 may also include user profile data associated with the first user profile/the first group of user profiles, where the user profile data may include location data, user preferences, device identifiers, device type, demographic information, how many times a past utterance is provided by the user, context information (location data, device identifier, device type, time at which the utterance was spoken, etc.) relating to the past utterances, etc.

During runtime or a third time period subsequent to the second time period, the system(s) 120 may process (1008) an input utterance associated with the first user profile using the fine-tuned query embedder 610 determined in step 1004. The system(s) 120 may determine utterance-level embedding data (e.g., 825) corresponding to the input utterance. For example, using the input utterance and other similar utterances in the graph, the system(s) 120 may determine alternative representations for them by traversing the graph. In another example, the system(s) 120 may determine the utterance-level embedding for an input utterance and determine top-k relevant rephrases using the kNN index in the projected space. The system(s) 120 may select one alternative representation for the input utterance, and may use (1012) the alternative representation of the input utterance as the AIS output 510.

FIG. 11 is a flowchart illustrating a process for using the query embedder to rank candidate alternative representations for an input according to embodiments of the present disclosure. The system(s) 120 may have already determined, during pre-training or a first time period, the pre-trained query embedder 720. During fine-tuning or a second time period subsequent the first time period, the system(s) 120 may determine (1102) the fine-tuning dataset 724 to include a past utterance and corresponding candidate alternative representations of the past utterance for multiple different dialog sessions. The candidate alternative representations of the past utterance may be determined using a rephrase provided by the user/speaker of the past utterance. The candidate alternative representations of the past utterance may be determined by a system user/admin. As described herein, the fine-tuning dataset may correspond to the particular task the model is being configured for, in this case, ranking candidate alternative representations. The fine-tuning dataset 724 may include text data representing the past utterances and the corresponding candidate alternative representations of the past utterances.

During the fine-tuning process, the system(s) 120 may determine (1104) the model data (weights, parameters, and other data) corresponding to the query embedder 610 to determine the fine-tuned model. The system(s) 120 may determine the model data and the fine-tuned query embedder 610 as described above in relation to FIG. 7B. The system(s) 120 may store the model data and the fine-tuned query embedder 610 as associated with the candidate alternative representation ranking task.

The system(s) 120 may determine (1106) task-specific data 615 for the candidate ranking task to include indexed utterance rephrase pairs (as described in relation to FIG. 9). In some embodiments, the system(s) 120 may determine that the task-specific data 615 includes a weighted directed graph that models historical utterances and NLU hypotheses data.

During runtime or a third time period subsequent to the second time period, the system(s) 120 may process (1108) an input utterance associated with the first user profile using the fine-tuned query embedder 610 determined in step 1104. The system(s) 120 may determine utterance-level embedding data (e.g., 825) corresponding to the input utterance. For example, using the input utterance (and other similar utterances) in the graph, the system(s) 120 may determine a list of potential alternative representations by traversing the graph. The system(s) 120 may also determine a score corresponding to each potential alternative representation based on weights/scores assigned to the nodes and edges in the graph. In another example, the system(s) 120 may determine the utterance-level embedding for an input utterance and determine top-k relevant rephrases using the kNN index in the projected space. The system(s) 120 may determine a score corresponding to relevant rephrase based on a semantic similarity between the relevant rephrase and the input utterance. The system(s) 120 may determine a ranked list of alternative representations based on the score corresponding to each alternative representation. The system(s) 120 may select one alternative representation for the input utterance, and may use (1112) the alternative representation of the input utterance as the AIS output 510.

FIG. 12 is a flowchart illustrating a process for using the query embedder to determine whether an input will cause friction according to embodiments of the present disclosure. The system(s) 120 may have already determined, during pre-training or a first time period, the pre-trained query embedder 720. During fine-tuning or a second time period subsequent the first time period, the system(s) 120 may determine (1202) the fine-tuning dataset 724 to include past utterances and a corresponding indication of whether processing of the past utterance resulted in friction (an error or an undesired response). As described herein, the fine-tuning dataset may correspond to the particular task the model is being configured for, in this case, friction determination. The fine-tuning dataset 724 may include text data representing the past utterance. The fine-tuning dataset 724 may include a corresponding Boolean value or other type of data indicating whether the past utterance resulted in the desired response or resulted in the system outputting an undesired response or an error. For example, the fine-tuning dataset 724 in this case may be {"What is the weather in Boston?", 1/yes/error}, {"play baby shark", 0/no/success}, etc.

During the fine-tuning process, the system(s) 120 may determine (1204) the model data (weights, parameters, and other data) corresponding to the query embedder 610 to determine the fine-tuned model. The system(s) 120 may determine the model data and the fine-tuned query embedder 610 as described above in relation to FIG. 7B. The system(s) 120 may store the model data and the fine-tuned query embedder 610 as associated with the friction determination task.

The system(s) 120 may determine (1206) task-specific data 615 for the friction determination task to include a probabilistic graph mapping multiple past utterances and its probability of causing an error/undesired response. During runtime or a third time period subsequent to the second time period, the system(s) 120 may process (1208) an input utterance using the fine-tuned query embedder 610 determined in step 1204. The system(s) 120 may determine utterance-level embedding data (e.g., 825) corresponding to the input utterance. The system(s) 120 may determine (1210) whether the input utterance will cause friction using the utterance-level embedding and the tasks-specific data 615. The system(s) 120 may determine a probability/likelihood of the input utterance causing friction based the semantic similarity between the input utterance and the past utterances represented in the probabilistic graph.

If the system(s) 120 determines that the input utterance will cause friction based on the determined probability satisfying a threshold/condition, then the system(s) 120 may determine (1212) an MS output 510 using one or more techniques described above (e.g., query rewriting, personalized query rewriting, ranked candidate alternative representations, or other friction reducing techniques). If the system(s) 120 determines that the input utterance will not cause friction (e.g., result in the desired response) based on the determined probability satisfying another threshold/condition, then the system(s) may send (1214) the ASR hypothesis corresponding to the input utterance (without rephrasing the input) to the NLU component for further processing.

For the various tasks that are described above, the system(s) 120 may determine/pre-compute, using the query embedder 610, utterance embedding data for any utterances/past utterances that are included in the task-specific data 615. The system(s) 120 may store the utterance embedding data for later use during runtime evaluation of a current user input. Similarly, the system(s) 120 may also determine/pre-compute embedding data for other data included in the task-specific data 615 (e.g., NLU hypotheses, user profile data, etc.) using the query embedder 610 or another encoder depending on the data type, and may store the embedding data for later use during runtime.

In this manner, in some embodiments, the system(s) 120 employs a trained model that has an encoder architecture and may be pre-trained on both utterance data and NLU hypothesis data, and may be fine-tuned for various tasks. For a query rewriting task, the trained model may be fine-tuned using alternative representations of utterances that result in a desired response. The trained model may be configured to determine an alternative representation based on an embedding-similarity between the input utterance and the alternative representation. Using a model that is pre-trained on a large amount of dialog session data improves the system(s) 120 ability to determine alternative representations for an input utterance.

Another task that the system described herein can be used for includes predicting data relating to a NLU hypothesis of a current user input based on the previous user input(s) in the dialog session. The system(s) 120 may use the operations described herein for intent classification for a current user input based on the previous user input(s) in the dialog session. The system(s) 120 may use the operations described herein for domain classification for a current user input based on the previous user input(s) in the dialog session. The system(s) 120 may use the operations described herein for entity recognition/resolution for a current user input based on the previous user input(s) in the dialog session.

For example, a user may be engaged in a dialog with the NLP system(s) 120, and may provide a current user input, which may represent an utterance at a second or third turn of the dialog session. The system(s) 120 may process the previous turn utterances to determine ASR data (text representing the previous utterances) and NLU data (hypothesis corresponding to the intent of the previous utterances). Using the previous turn ASR data and NLU data, the query embedder 610 may predict the domain, intent, slot type and/or slot value for the next/current utterance in the dialog session. In this embodiment, the pre-trained model 720 may be fine-tuned using a fine-tuning dataset 724 that includes data relating to a dialog session identifying a first utterance, and at least a second utterance, and their corresponding domain, intent, slot type, and slot value. For example, the fine-tuning dataset 724 may include {"play baby shark", Domain: Music, Intent: PlayMusic: SongName: baby shark}, {"play lil nas x old town road", Domain: Music, Intent: PlayMusic, ArtistName: lil nas x, SongName: old town road}, etc. The fine-tuning dataset 724 may include such data relating to multiple different dialog sessions that correspond to multiple different user profiles.

The system(s) 120 may process the current user input using the query embedder 610 to determine utterance embedding data. The task-specific data 615 may include indexed past utterances (represented by their utterance embedding data determined/pre-computed using the query embedder 610) so that the system(s) 120 can determine past utterances that may be similar to the current user input based on a semantic similarity.

The system(s) 120 may also process the previous user inputs in the dialog session using the query embedder XXH10 to determine previous utterance embedding data. The system(s) 120 may also process the NLU data (domain, intent, slot type, slot value) corresponding to the previous user inputs using the query embedder 610 to determine previous NLU embedding data. Using the previous utterance embedding data, the previous NLU embedding data, the utterance embedding data for the current user input and the task-specific data 615, the system(s) 120 may predict the domain, intent, slot type and/or slot value for the current user input in the dialog session. The system(s) 120 may perform this task after the current user input has been processed by the ASR component 250 and before the NLU component 260 has processed the current user input. The system(s) 120 may provide the predicted NLU data for the current user input to the NLU component 260 to aid in determining the NLU hypothesis for the current user input, to rank/rerank/rescore the N-best NLU hypotheses for the current user input, to determine additional NLU hypotheses for the N-best NLU hypotheses that the NLU component 260 may not have determined using the ASR data for the current user input, to ensure that there was no error in the NLU processing of the current user input, and the like.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 14:
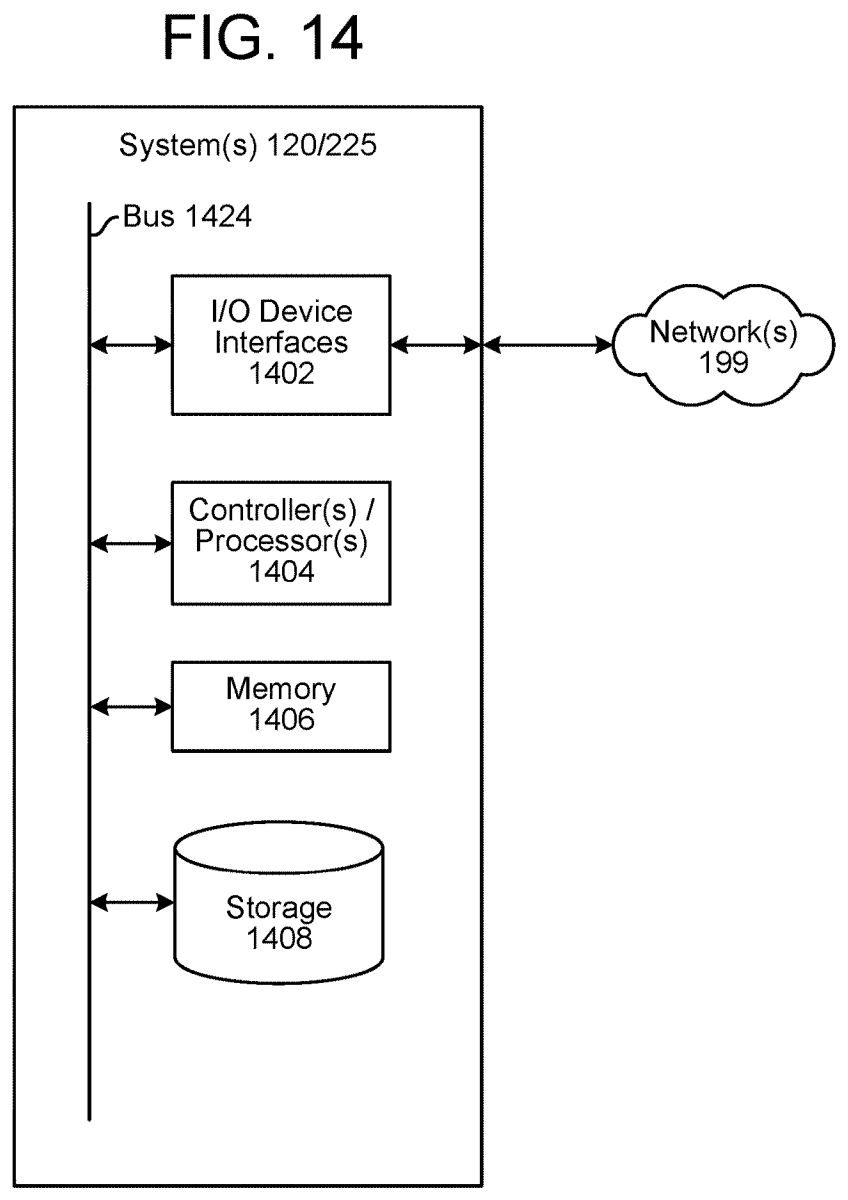

FIG. 13 is a block diagram conceptually illustrating a device 110 that may be used with the system. FIG. 14 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/225) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1302/1402).

Computer instructions for operating each device (110/120/225) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/225) includes input/output device interfaces (1302/1402). A variety of components may be connected through the input/output device interfaces (1302/1402), as will be discussed further below. Additionally, each device (110/120/225) may include an address/data bus (1324/1424) for conveying data among components of the respective device. Each component within a device (110/120/225) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1314, the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (1302/1402), processor(s) (1304/1404), memory (1306/1406), and/or storage (1308/1408) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 15:
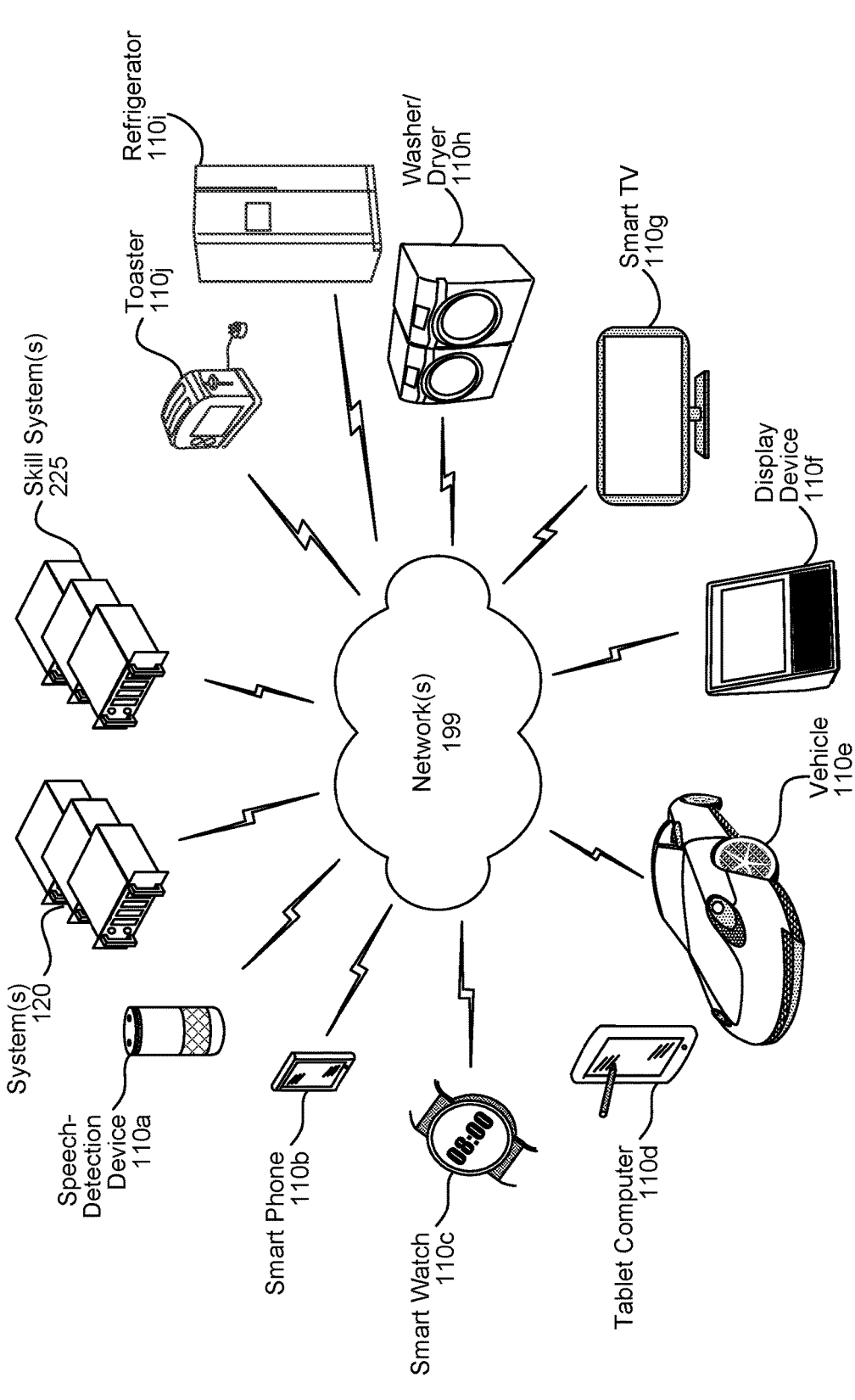
FIG. 15 illustrates an example of a computer network for use with the speech processing system.

As illustrated in FIG. 15, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving first input data representing a first natural language input;

receiving first output data responsive to the first natural language input;

receiving a first indication of user dissatisfaction corresponding to the first output data;

receiving second input data representing a second natural language input;

receiving second output data responsive to the second natural language input;

receiving a second indication of user satisfaction corresponding to the second output data;

in response to receiving the second indication, determining first data including the first input data and the second input data;

receiving third input data representing a third natural language input;

processing, using a machine learning model, the third input data to determine a likelihood that a response for the third input data will result in user dissatisfaction, wherein the machine learning model is pre-trained using historical dialog session data and the machine learning model is fine-tuned using at least the first data;

based on the likelihood, processing, using the machine learning model, the third input data to determine second data including an alternative representation of the third natural language input;

determining, using the second data, third output data corresponding to the third natural language input; and causing presentation of the third output data in response to the third natural language input.

2. The computer-implemented method of claim 1, further comprising:

determining the first natural language input is semantically similar to the second natural language input; and determining the first data based on the first natural language input is semantically similar to the second natural language input.

3. The computer-implemented method of claim 1, wherein the first natural language input is associated with a first user profile and the second natural language input is associated with a second user profile different from the first user profile.

4. The computer-implemented method of claim 1, wherein a first user profile associated with the first natural language input and the second natural language input corresponds to a user type, wherein the first data further corresponds to the user type, wherein the third input data is associated with a second user profile corresponding to the user type.

5. The computer-implemented method of claim 1, wherein:

the first natural language input, the second natural language input, and the third natural language input are associated with a user profile, the first data is associated with the user profile, and the method further comprises:

selecting the first data to process the third input data using the machine learning model.

6. The computer-implemented method of claim 1, further comprising:

receiving first contextual information corresponding to at least one of the first natural language input or the second natural language input;

receiving second contextual information corresponding to the third natural language input; and determining the likelihood using the machine learning model based on correspondence of the first contextual information and the second contextual information.

7. The computer-implemented method of claim 1, wherein determining the likelihood is based on a semantic similarity of the first natural language input and the third natural language input.

8. The computer-implemented method of claim 1, further comprising:

receiving a first semantic interpretation of the first natural language input determined based on the first input data;

receiving a second semantic interpretation of the second natural language input determined based on the second input data; and determining the first data to further represent a correspondence between the first semantic interpretation and the second semantic interpretation.

9. A system, comprising:

at least one processor; and at least one memory comprising instructions that, when executed by the at least one processor, cause the system to:

receive first input data representing a first natural language input;

receive first output data responsive to the first natural language input;

receive a first indication of user dissatisfaction corresponding to the first output data;

receive second input data representing a second natural language input;

receive second output data responsive to the second natural language input;

receive a second indication of user satisfaction corresponding to the second output data;

in response to receiving the second indication, determine first data including the first input data and the second input data;

receive third input data representing a third natural language input;

process, using a machine learning model, the third input data to determine a likelihood that a response for the third input data will result in user dissatisfaction, wherein the machine learning model is pre-trained using historical dialog session data and the machine learning model is fine-tuned using at least the first data;

based on the likelihood, process, using the machine learning model, the third input data to determine second data including an alternative representation of the third natural language input;

determine, using the second data, third output data corresponding to the third natural language input; and cause presentation of the third output data in response to the third natural language input.

10. The system of claim 9, wherein the at least one memory further includes instructions that, when executed by the at least one processor, further cause the system to:

determine the first natural language input is semantically similar to the second natural language input; and determine the first data based on determining that the first natural language input is semantically similar to the second natural language input.

11. The system of claim 9, wherein the first natural language input is associated with a first user profile and the second natural language input is associated with a second user profile different from the first user profile.

12. The system of claim 9, wherein a first user profile associated with the first natural language input and the second natural language input corresponds to a user type, wherein the first data further corresponds to the user type, wherein the third input data is associated with a second user profile corresponding to the user type.

13. The system of claim 9, wherein:

the first natural language input, the second natural language input, and the third natural language input are associated with a user profile, the first data is associated with the user profile, and the at least one memory further includes instructions that, when executed by the at least one processor, further cause the system to:

select the first data to process the third input data using the machine learning model.

14. The system of claim 9, wherein the at least one memory further includes instructions that, when executed by the at least one processor, further cause the system to:

receive first contextual information corresponding to at least one of the first natural language input or the second natural language input;

receive second contextual information corresponding to the third natural language input; and determine the likelihood using the machine learning model based on correspondence of the first contextual information and the second contextual information.

15. The system of claim 9, wherein determining the likelihood is based on a semantic similarity of the first natural language input and the third natural language input.

\* \* \* \* \*